(12) United States Patent
Fujii et al.

(10) Patent No.: US 6,494,395 B1
(45) Date of Patent: Dec. 17, 2002

(54) SEAT BELT RETRACTOR WITH CLUTCH MECHANISM

(75) Inventors: Hiroaki Fujii, Tokyo (JP); Hiromasa Tanji, Tokyo (JP)

(73) Assignee: Takata Corporation, Tokyo (JP)

( * ) Notice: Subject to any disclaimer, the term of this patent is extended or adjusted under 35 U.S.C. 154(b) by 48 days.

(21) Appl. No.: 09/696,637

(22) Filed: Oct. 26, 2000

(30) Foreign Application Priority Data

Nov. 2, 1999 (JP) .............................. 11-313028
Dec. 6, 1999 (JP) .............................. 11-346273

(51) Int. Cl.⁷ .......................... B60R 22/34; B60R 22/44
(52) U.S. Cl. ................................. 242/374; 242/390.8
(58) Field of Search .............................. 242/374, 390.8, 242/390.9; 280/806, 807; 297/475, 476, 477, 478

(56) References Cited

U.S. PATENT DOCUMENTS

| 4,592,520 A | * | 6/1986 | Kawaguchi | 242/371 |
| 4,787,569 A | * | 11/1988 | Kanada et al. | 242/374 |
| 4,925,123 A | * | 5/1990 | Frei et al. | 242/374 |
| 5,451,008 A | * | 9/1995 | Hamaue | 242/374 |
| 5,526,996 A | * | 6/1996 | Ebner et al. | 242/374 |
| 5,794,876 A | * | 8/1998 | Morizane et al. | 242/374 |
| 5,906,328 A | * | 5/1999 | Hamaue et al. | 192/103 A |
| 5,918,717 A | * | 7/1999 | Fohl | 192/38 |
| 6,244,531 B1 | * | 6/2001 | Hori et al. | 180/268 |
| 6,257,363 B1 | * | 7/2001 | Midorikawa et al. | 242/390.8 |
| 6,332,629 B1 | * | 12/2001 | Midorikawa et al. | 242/374 |
| 6,343,759 B1 | * | 2/2002 | Specht | 242/374 |

FOREIGN PATENT DOCUMENTS

JP          3-552       * 1/1991

* cited by examiner

Primary Examiner—John M. Jillions
(74) Attorney, Agent, or Firm—Kanesaka & Takeuchi

(57) ABSTRACT

A seat belt retractor is formed of a reel for winding a seat belt, and a spring member connected to the reel for providing a retracting force thereto. The retracting force is weak not to provide a feeling of oppression to a passenger when the passenger has fastened the seat belt. A motor is connected to the reel for driving the reel only in a direction of retracting the seat belt to generate a retracting force greater than that of the spring member. Thus, the seat belt retractor retracts the seat belt by sufficiently great retracting force, but does not provide a feeling of oppression to the person when properly fastened.

11 Claims, 16 Drawing Sheets

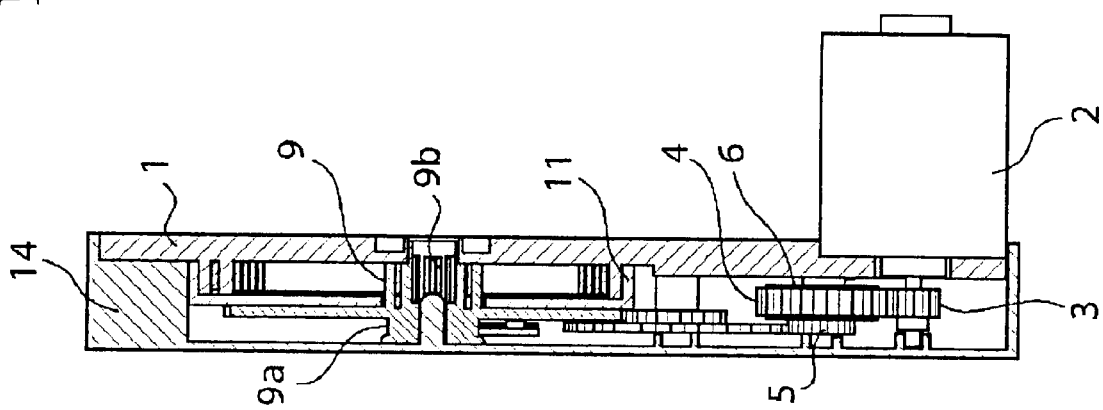
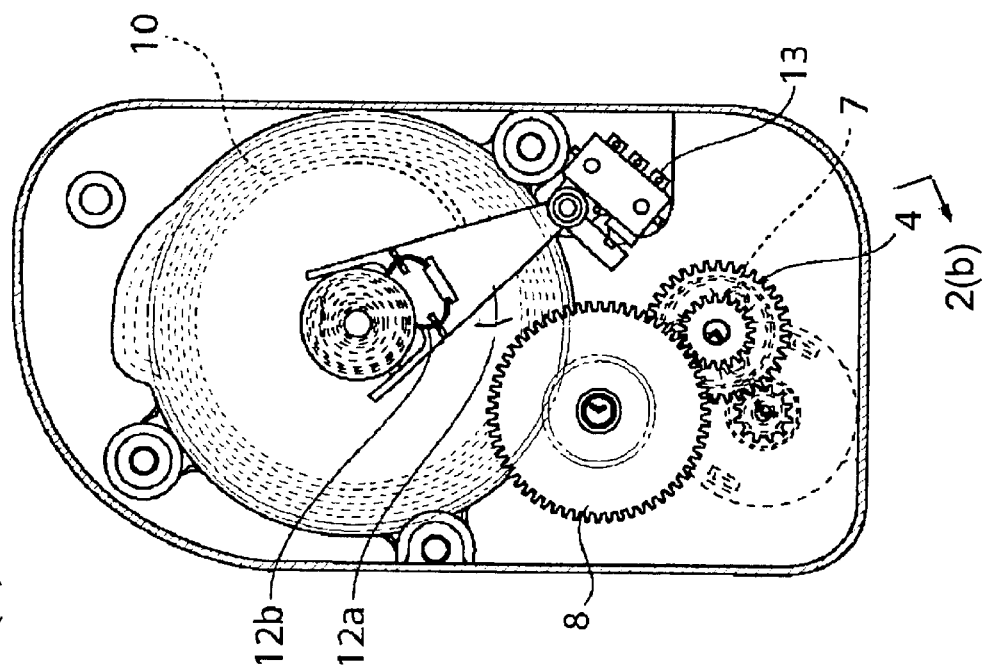

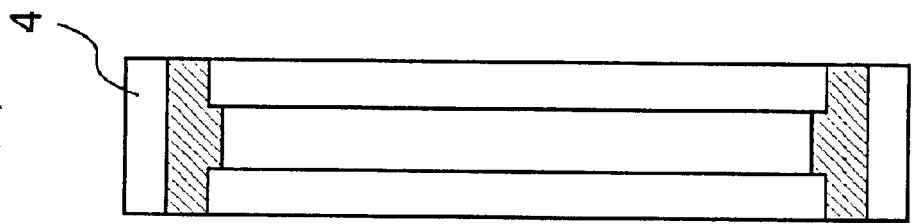
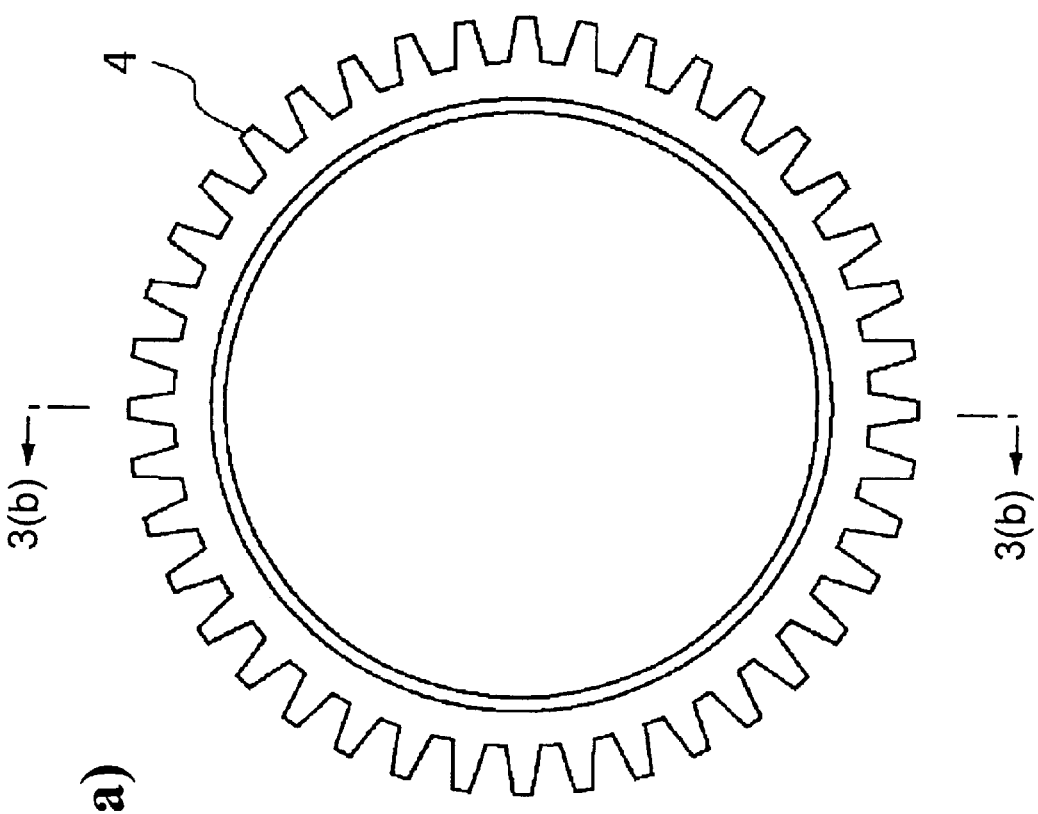

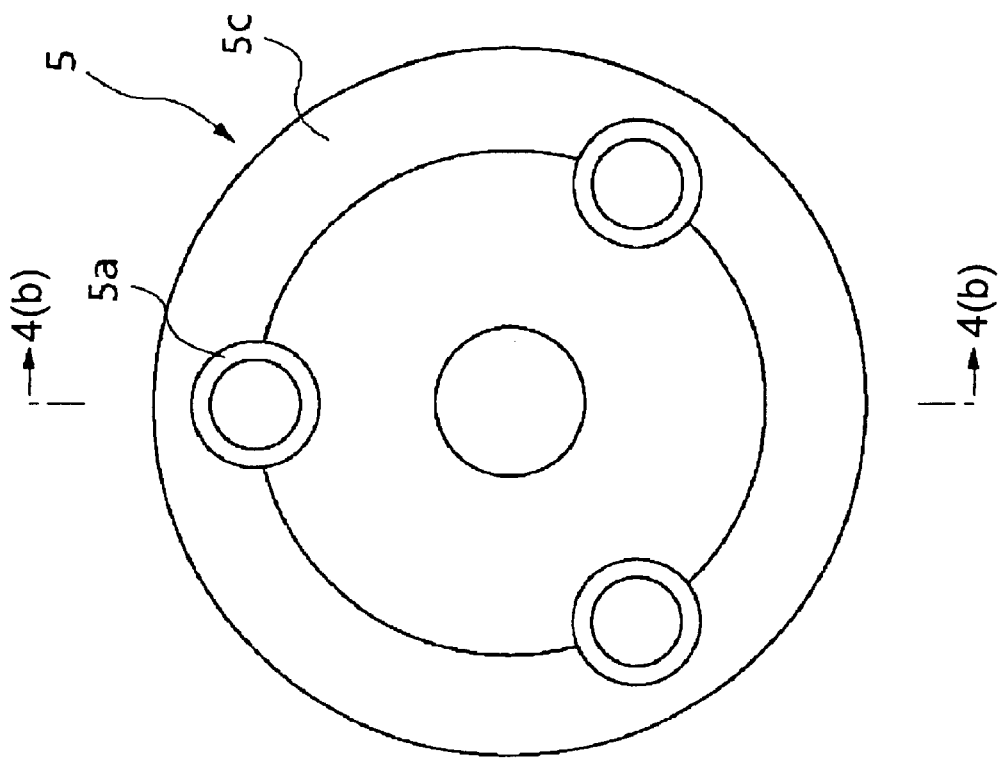
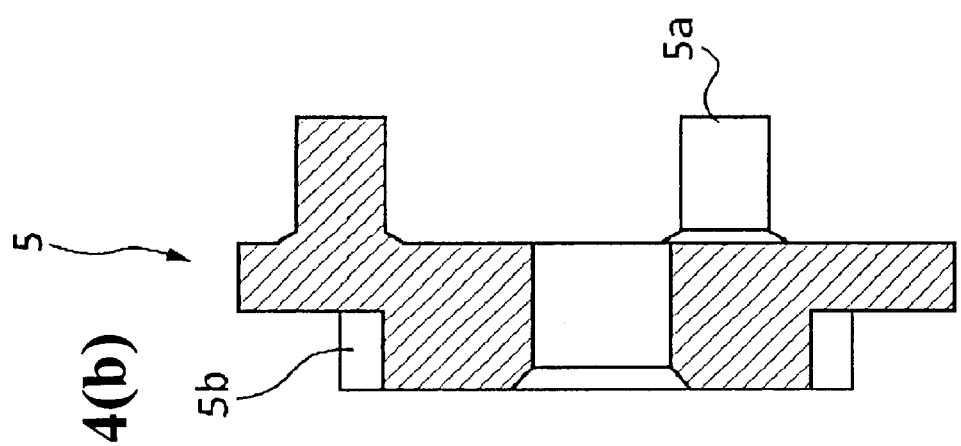

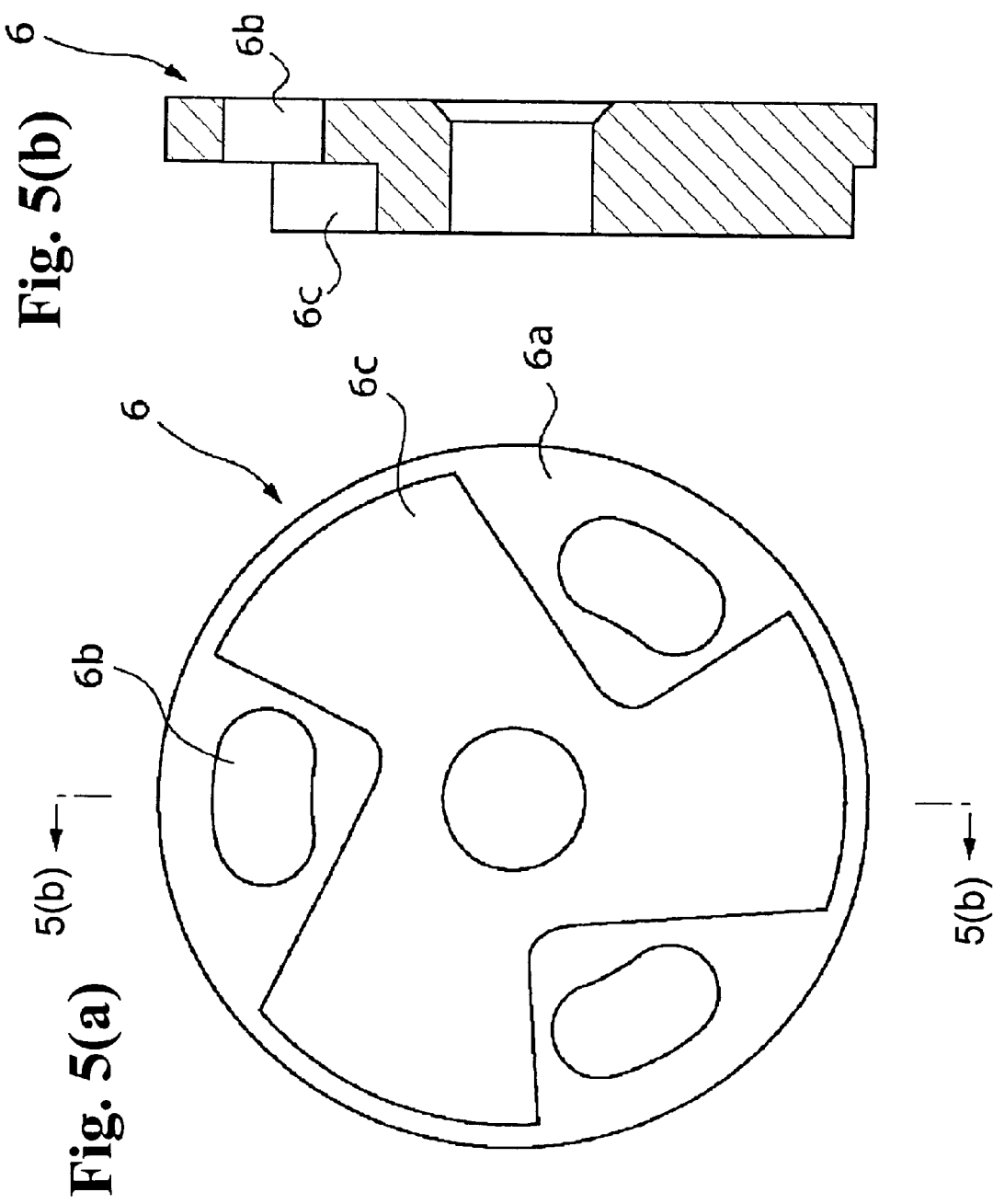

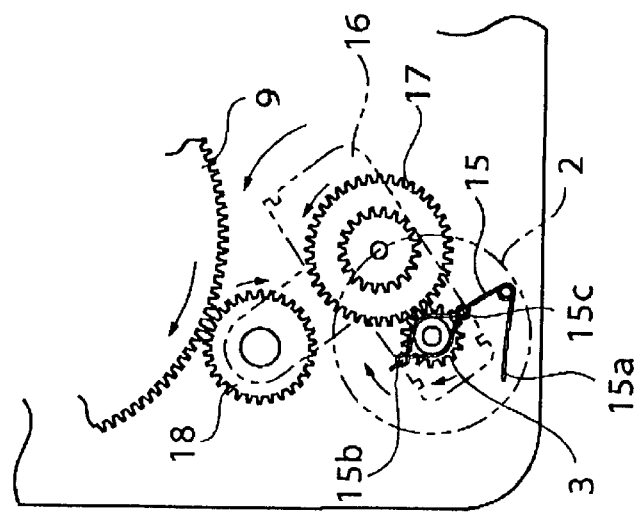
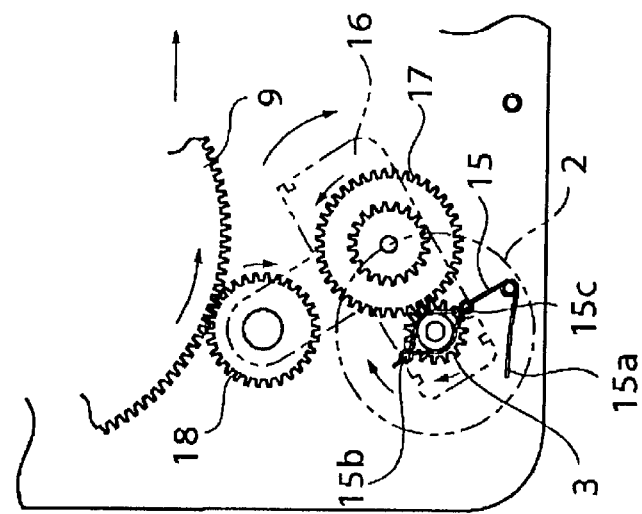
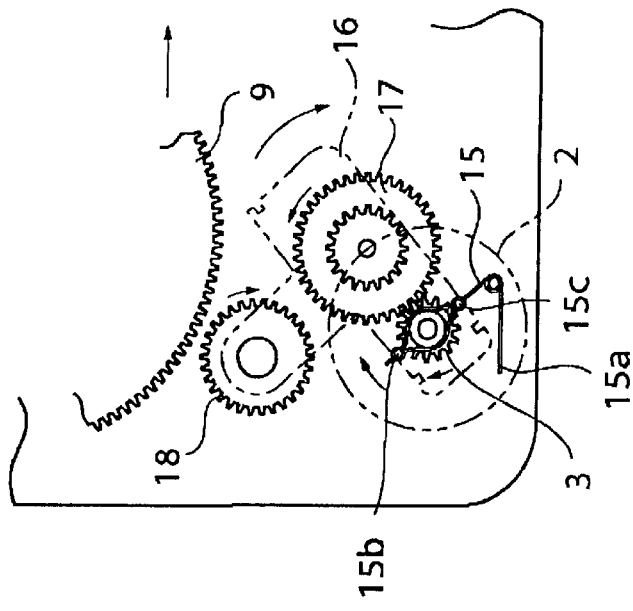

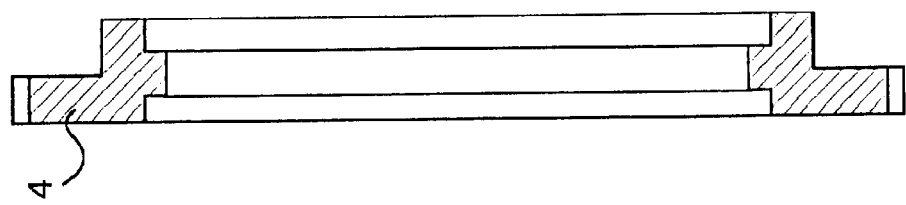
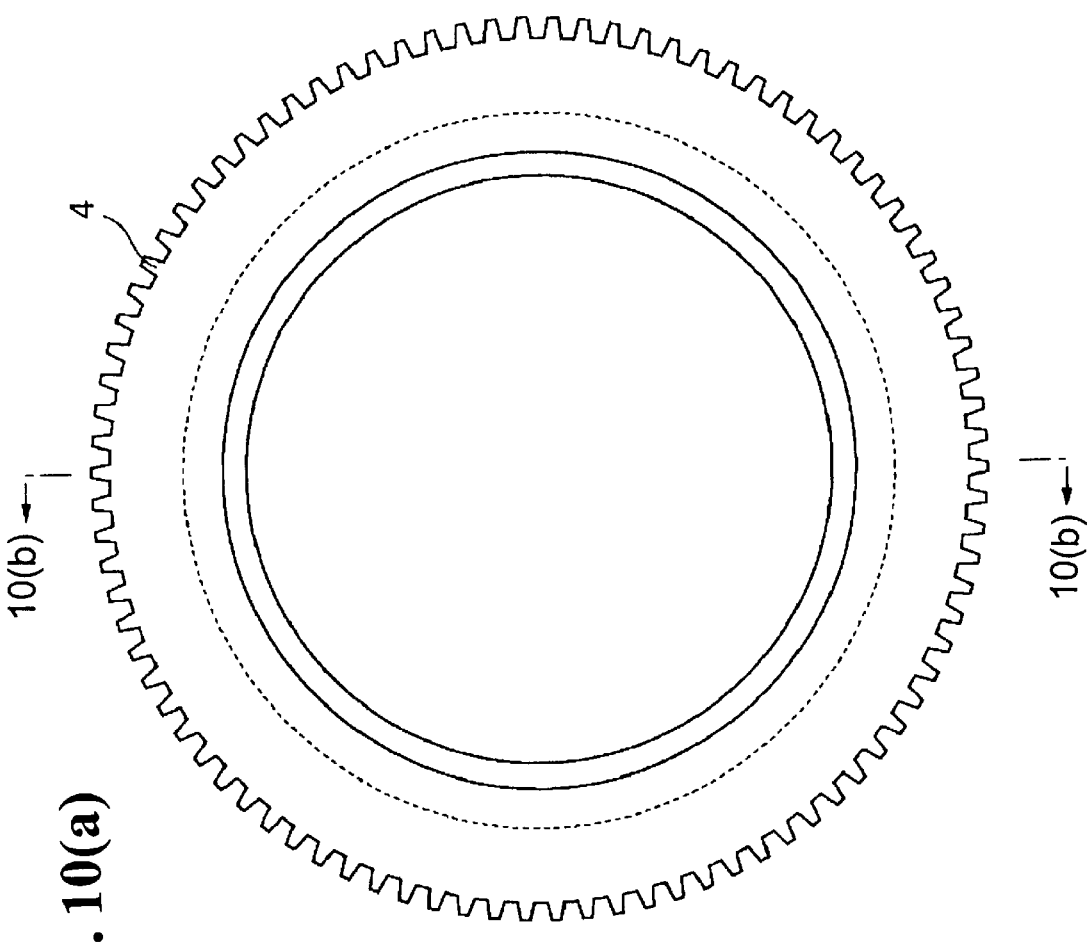

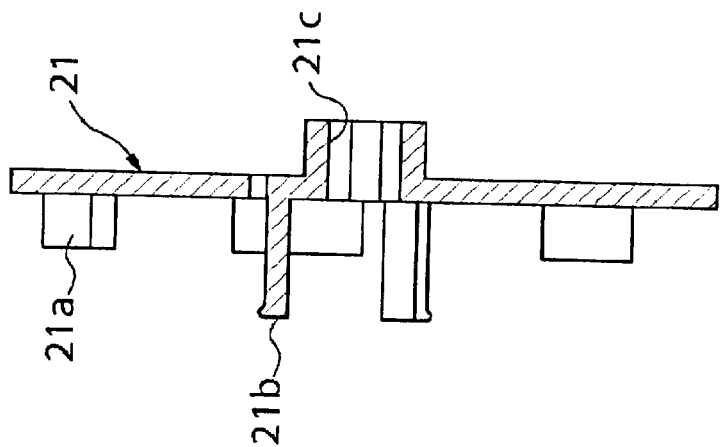
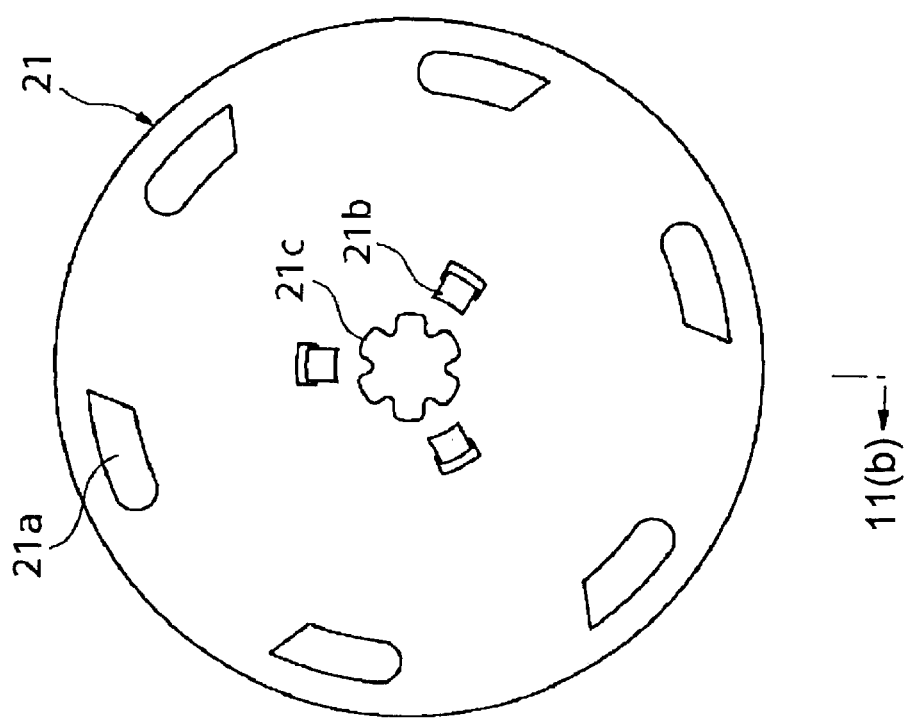

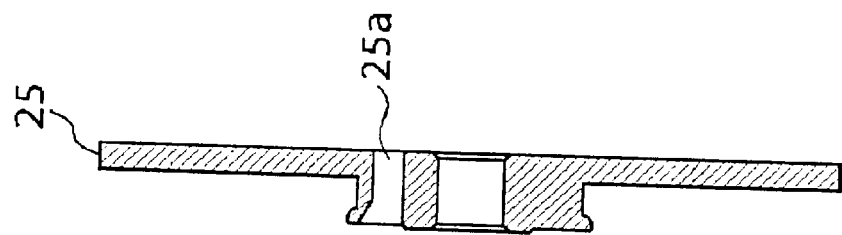
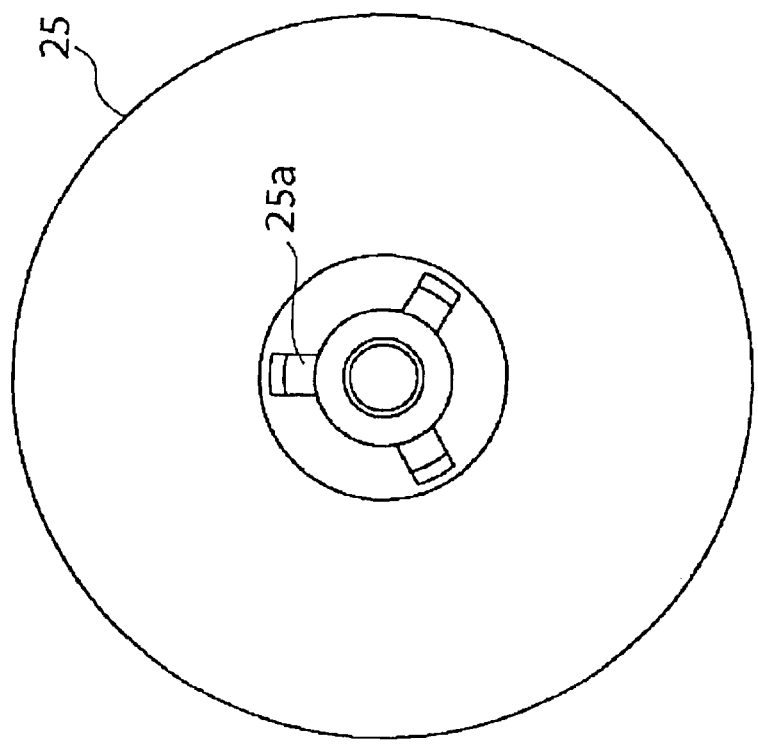

SEAT BELT RETRACTOR WITH CLUTCH MECHANISM

BACKGROUND OF THE INVENTION AND RELATED ART STATEMENT

The present invention relates to a seat belt retractor which is furnished inside a vehicle, such as an automobile.

A seat belt retractor which is equipped in an automobile, and the like, has a function of retracting a part of the seat belt pulled out too much when the passenger has taken a seat, pulled out the seat belt and coupled a tongue into the buckle. In order to realize this mechanism, in the seat belt retractor of the past, a single return spring has been used. When the person fastens the seat belt and releases one's hand after pulling out the seat belt in opposition to the force of this return spring and coupling the tongue to the buckle, the part of the seat belt pulled out too much is drawn into the seat belt retractor by the force of the return spring until it fits the body of the person.

In the seat belt retractor as explained above, it is necessary to simultaneously satisfy:

(1) that the seat belt pulled out too much is surely retracted until it fits the body of the person, and that when the person is not wearing it, the pulled out seat belt is surely housed in the housing part, and (2) that unnecessary feeling of oppression is not provided to the chest, and the like, of the passenger when it is properly fastened.

However, with the seat belt retractor using the force of a single return spring, when a spring having weak force is used in order to lessen the feeling of oppression to the chest of the passenger when fastened, the retracting force during retraction or during housing of the belt becomes weaker, and the operability and storability are reduced. Conversely, when a spring having strong force is used in order to exhibit sufficient retracting force during retraction, there is a problem that the feeling of oppression to the chest of the passenger when properly fastened becomes greater.

Also, with the seat belt retractor of the past, because a single return spring is internally installed, there also is a problem that as the seat belt is pulled out further, the return spring is further wound and its force increases, and as the seat belt is pulled out further, the force to pull it out also increases.

As one means for solving such problems, there is an invention disclosed in Japanese Patent Publication (KOKAI) No. H3-552. This attempts to reduce the feeling of oppression of the passenger when properly fastened while assuring retracting force during retraction of the belt by using two springs as return springs, i.e. a main spring and an auxiliary spring. In detecting the coupling of the tongue and buckle of the seat belt with a detector, the forces of both the main spring and the auxiliary spring are transferred to the retraction mechanism in a state that the tongue and buckle are not coupled, and the force only of the main spring is transferred to the retraction mechanism when the tongue and buckle are coupled.

However, in this case as well, the problem that the force for pulling out the seat belt increases as it is pulled out further is not circumvented, and furthermore, a separate phenomenon has occurred such that when the seat belt is removed, as soon as the coupling of the tongue and the buckle is released, the retracting force suddenly becomes stronger, and it provides a feeling of discomfort to the passenger.

The present invention has been made in consideration of such circumstances, and it is an object of the invention to provide a seat belt retractor that surely retracts the seat belt by sufficiently great retracting force during retraction, and does not provide a feeling of oppression to the person when properly fastened, and moreover can eliminate the feeling of discomfort caused during retraction, and furthermore does not require great force when the person pulls out the seat belt.

SUMMARY OF THE INVENTION

In the first aspect for solving the aforementioned problems, a seat belt retractor includes a spring member that generates retracting force weak enough not to provide a feeling of oppression to a passenger when the passenger has fastened the seat belt, and a motor that is driven only in the direction of retracting the seat belt and generates retracting force stronger than the spring member.

In this respect, it can be made such that the retracting force is provided by the spring member when the seat belt is properly fastened, and made such that the retracting force having added retracting force by a motor to this or retracting force of the motor alone is provided to the seat belt when retracting the seat belt in a state when the tongue and the buckle are not coupled. Therefore, the seat belt can be fitted to the person with a retracting force that does not provide a feeling of oppression to the person when properly fastened, and it can be retracted with great retracting force during retraction. Also, because great retracting force is generated by the motor, even when great retracting force is suddenly applied when the coupling of the tongue and the buckle is released, there is no situation such as the tongue striking the window. As for judgment of whether it is properly fastened or retracted, it is assumed such that, in the same manner as in the past, it is considered to be a retraction time for a specified time after the coupling of the tongue and the buckle is released, and it is considered to be properly fastened in other cases including pulling out of the seat belt.

In the second aspect for solving the aforementioned problems, the motor is provided with driving force only when the tongue and buckle attached to the seat belt are not coupled.

In this second aspect, when the tongue and the buckle are coupled, it is considered that the person has finished fastening of the seat belt, and driving of the motor is not performed. Therefore, because absorption of the slack of the seat belt and fitting to the person is performed by only the force of the spring member, at this extent, a feeling of oppression is not provided to the person.

In the third aspect for solving the aforementioned problems, the motor is not provided with driving force when the seat belt is withdrawn.

In the third aspect, even if the tongue and the buckle are not coupled, when the seat belt is withdrawn in the direction of pulling out by a person, driving of the motor is stopped. Therefore, because there is no need to pull out against the driving force of the motor when the person pulls out the seat belt, it can be pulled out easily. Determination of whether or not the seat belt is driven in the direction of being pulled out can be performed, for example as shown in the example to be described later, by a switch that detects the direction of rotation of the drive shaft of the seat belt driving mechanism.

In the fourth aspect for solving the aforementioned problems, retraction by the motor is performed for only a specified time or a specified number of revolutions after coupling of the tongue and buckle is detected.

In the fourth aspect, substantially all of the slack can be absorbed rapidly by performing retraction by the motor for only a specified time or a specified number of revolutions after the seat belt is fastened, and coupling of the tongue and the buckle is detected. After that, because retraction by the spring member is performed rather than retraction by the motor, a feeling of oppression is not provided to the person.

In the fifth aspect for solving the aforementioned problems, in any of the first to fourth aspects, it is equipped with a detector that detects a direction of rotation of a spool that winds up the seat belt.

In the fifth aspect, for example when the seat belt is pulled out manually, control such as detecting that rotation and stopping the rotation of the motor can be performed.

In the sixth aspect for solving the aforementioned problems, it has a power propagation mechanism that propagates retracting force of the spring member and the motor to the seat belt, and the power propagation mechanism has a clutch mechanism that disengages the mechanical power propagation circuit between the motor and the seat belt when driven in the direction that the seat belt is pulled out by external force or when not driven in the direction that the motor retracts the seat belt.

In the sixth aspect, when the seat belt is driven in the direction of being pulled out by external force, the mechanical power propagation circuit between the motor and the seat belt is disengaged by the clutch mechanism. Therefore, because the motor does not become a load on the pulling out force, the seat belt can be pulled out with little force. Also, when the motor is not driven in the direction of retracting the seat belt, the mechanical power propagation circuit between the motor and the seat belt is disengaged by the clutch mechanism. Therefore, because the motor does not become a load on the retracting force by the spring member, the slack of the seat belt can be surely absorbed.

The seventh aspect for solving the aforementioned problems is a seat belt retractor, wherein said clutch mechanism is incorporated inside a rotating member that propagates driving force of the motor to the seat belt.

In the seventh aspect, because the clutch mechanism is incorporated inside the rotating member (for example gear or pulley) that propagates the driving force of the motor to the seat belt, the entire device can be made compact.

In the eighth aspect for solving the aforementioned problems, the clutch mechanism is directly connected to the spool that winds up the seat belt.

When the seat belt is driven in the direction of being pulled out by external force and the mechanical power propagation circuit between the motor and the seat belt wind-up unit (spool) is disengaged by the clutch mechanism, because there is considerable friction between the components, the feeling during pulling out may become poor due to the frictional resistance. If the clutch mechanism is placed within a decelerating mechanism between the motor and the spool, this friction from the side of the spool becomes greater according to the rate of deceleration, and the feeling becomes particularly poor. In the eighth aspect, because the clutch mechanism is directly connected to the spool that winds up the seat belt, the influence of the friction from the side of the spool becomes smaller, and degradation of the feeling can be controlled to a minimum.

In the ninth aspect for solving the aforementioned problems, a clutch is constituted by a roller held between an outer member and an inner member. The clutch includes a protruding part formed at the perimeter of the inner member, and it forms a wedge shape such that the interval between the perimeter of the inner member where the protruding part is not formed and the inner perimeter of the outer member is wider than the diameter of the roller in a given part and is narrower than the diameter of said roller in the part following that part. The clutch becomes an engaged state by the roller performing a wedge action by biting into the part where the interval between the perimeter of the inner member and the inner perimeter of the outer member is narrower than the diameter of the roller, and the clutch becomes a disengaged state by the roller positioned at the part where the interval between the perimeter of the inner member and the inner perimeter of the outer member is wider than the diameter of the roller.

In the ninth aspect, the roller is placed within the perimeter of the inner member and the inner perimeter of the outer member as well as the protruding part, and operation of the clutch can be performed according to whether that roller is positioned in the part where the interval between the perimeter of the inner member and the inner perimeter of the outer member is narrower than the diameter of the roller or whether it is positioned in the wider part. Therefore, it becomes possible for the clutch to operate naturally according to the direction of rotation without requiring electromagnetic power or external mechanical power, or the like, for operation of the clutch.

In the present specification, "roller" is not limited to a cylindrical object, and it also may be a spherical object.

In the tenth aspect for solving the aforementioned problems, the clutch comprises a second rotating member provided inside a first rotating member coaxially with the first rotating member, and a holding member provided inside the first rotating member coaxially with the first rotating member. The second rotating member has a roller holding part extending in the axial direction, and the roller is held on the roller holding part to rotate freely in contact with the inner perimeter of the first rotating member. The holding member is provided with a cut-out part for accommodating the roller, and the shape of the cut-out part is formed such that the space surrounded by the cut-out part and the inner perimeter of the first rotating member when viewed from the axial direction is narrower than the diameter of the roller at one end in the circumferential direction and is wider than the diameter of the roller at the other end. A mechanism that allows only a specified amount of relative rotation between the second rotating member and the holding member is provided on the second rotating member and the holding member.

The operation of this aspect is explained by taking an example of the case when the motor is connected to the first rotating member, and the spring member and the spool that winds up the seat belt are connected to the second rotating member in the seat belt retractor. In this respect, as will be elaborated in detail in the example described later, in the normal state, the second rotating member is urged by the force of the spring member to rotate, for example, counterclockwise.

By this, the roller together with the roller holding part is also forced to revolve counterclockwise, and the extended part of the holding member is pushed counterclockwise. Accordingly, the holding member also rotates counterclockwise, the second rotating member and the holding member both rotate inside the first rotating member, and their rotational forces are not relayed to the first rotating member. Therefore, for example, the mechanical power propagation circuit between the motor, and the spring member and the seat belt becomes in a disengaged state, and the motor does not become a load on the spring member.

When the first rotating member is driven counterclockwise by the motor driven in the direction of retracting the seat belt, the roller is placed between the inner perimeter of the first rotating member and the cut-out part of the holding member (on the end having a space narrower than the diameter of the roller). Therefore, the roller receives counterclockwise revolving force by the friction between the roller and the inner perimeter of the first rotating member, and the second rotating member also receives counterclockwise force by way of the roller holding part.

Because the roller comes in contact with the end of the cut-out part of the holding member and pushes the holding member, the holding member rotates counterclockwise and attempts to escape, but because a limit is provided to the amount of relative rotation between the holding member and the second rotating member, the amount of escape of the holding member is limited, and in the end, when the amount of relative rotation between the holding member and the second rotating member has reached the limit, the roller is placed between the inner perimeter of the first rotating member and the cut-out part of the holding member and rotates together with the first rotating member, and its driving force comes to be propagated to the second rotating member. In this state, for example, the power propagation circuit between the motor shaft, and the spring member and the seat belt comes to engage mechanically.

For example, when the seat belt is driven in the direction of being pulled out by a person pulling out the seat belt, and the second rotating member is driven clockwise, the roller also revolves counterclockwise by way of the roller holding part, it hits the end of the cut-out part of the holding member (opposite to the end previously described), and pushes the holding member clockwise. At this time, the roller is positioned at the end within the space formed by the inner perimeter of the first rotating member and the cut-out part of the holding member where it is formed wider than the diameter of the roller. Therefore, the rotational force of the second rotating member is not relayed to the first rotating member. Therefore, for example, the mechanical power propagation circuit between the roller, and the spring member and the seat belt becomes in a disengaged state. Therefore, for example, when the seat belt is pulled out, the motor does not become a load on the pulling out force, and the pulling out of the seat belt can be performed easily.

In the eleventh aspect for solving the aforementioned problems, the clutch comprises a rotating member (second rotating member) provided inside a first rotating member coaxially with the first rotating member and being mechanically connected to a spool that winds up the seat belt and the spring member, a holding member provided inside the first rotating member coaxially with the first rotating member, and a roller. The second rotating member has a bump on one side, and the holding member has a perimeter part where the distance from the center changes continuously, a protruding part formed by extending outward a part of the perimeter part, and a spring member. When the second rotating member, the holding member, and the roller are incorporated in the first rotating member, the roller is positioned so as to be held within the inner perimeter of the first rotating member, the perimeter part of the holding member, the protruding part of the holding member, and the bump of the second rotating member. The interval between the inner perimeter of the first holding member and the perimeter part of the holding member is made larger than the diameter of the roller at the wide part and is made wider than the diameter of the roller at the narrow part. The spring member is disposed so as to urge the roller in the direction where the interval between the inner perimeter of the first rotating member and the perimeter part of the holding member becomes narrow.

The operation of this aspect is explained by taking an example of the case that the motor is connected to the first rotating member, and the spring member and the spool that winds up the seat belt are connected to the second rotating member in the seat belt retractor. In this aspect, as will be elaborated in detail in the section later, assuming that, for example, in the normal state, the second rotating member is urged by the force of the spring member to rotate, for example, counterclockwise, and the interval between the inner perimeter of the first rotating member and the perimeter part of the holding member is made wider toward the clockwise direction.

When the second rotating member is rotated counterclockwise, its bump collides with the protruding part of the holding member, and it causes the holding member to rotate counterclockwise. Then, the roller is repelled by the force of the spring and moves clockwise relative to the holding member, and it comes to a position where the interval between the inner perimeter of the first rotating member and the perimeter part of the holding member is larger than the diameter of the roller. Therefore, the mechanical coupling between the holding member and the first rotating member is separated, and the rotational force of the holding member is no longer relayed to the first rotating member. That is, because the rotational force of the second rotating member is not relayed to the first rotating member, for example, the mechanical power propagation circuit between the motor, and the spring member and the seat belt becomes in a disengaged state, and the motor does not become a load on the spring member.

For example, when the motor is driven in the direction of retracting the seat belt and the first rotating member is driven counterclockwise, the roller comes to be pushed counterclockwise by the force of the spring up to the part where the interval between the inner perimeter of the first rotating member and the perimeter part of the holding member becomes equal to the diameter of the roller. Thus, it is pushed in the direction where the interval between the inner perimeter of the first rotating member and the perimeter part of the holding member becomes narrower than the roller, the roller becomes a wedge and is tightly held between the inner perimeter of the first rotating member and the perimeter part of the holding member, and the rotational force of the first rotating member is propagated to the holding member, so that the holding member and the roller rotate together with the first rotating member.

When the roller goes on to rotate, i.e. revolve, together with the first rotating member and the holding member, it collides with the bump of the second rotating member, and pushes the bump in the counterclockwise direction. Therefore, by this force, the second rotating member comes to rotate in the counterclockwise direction together with the first rotating member. That is, in this case, the first rotating member and the second rotating member are coupled through the clutch, and for example, the rotational force of the motor comes to be propagated to the spring member and the spool of the seat belt.

For example, when the seat belt is driven in the direction of being pulled out by a person pulling out the seat belt and the second rotating member is driven in the clockwise direction, the bump of the second rotating member collides with the roller, overcomes the force of the spring, and causes the roller to move in the clockwise direction. By this, the roller collides with the protruding part of the holding member and causes the holding member to rotate in the clockwise direction.

As described before, because the interval between the inner perimeter of the first rotating member and the perimeter part of the holding member becomes wider toward the clockwise side, when the roller moves in the counterclockwise direction, it comes to a position where the interval between the inner perimeter of the first rotating member and the perimeter part of the holding member is greater than the diameter of the roller. Therefore, the mechanical coupling between the holding member and the first rotating member is separated, and the rotational force of the holding member is no longer relayed to the first rotating member. That is, because the rotational force of the second rotating member is not relayed to the first rotating member, for example, the mechanical power propagation circuit between the motor, and the spring member and the seat belt becomes in a disengaged state, and the motor does not become a load on the pulling out force of the seat belt, so that the pulling out can be performed easily.

In the twelfth aspect for solving the aforementioned problems, a seat belt retractor includes the device disclosed in any of the ninth to eleventh aspects.

In this aspect, the rotational force of the motor can be propagated to the retraction apparatus without using special control or power, and the motor can be made such that it does not become a load on the spring member when pulling out the seat belt. It goes without saying that when the tenth aspect and the eleventh aspect is used, the first rotating member is connected to the motor side, and the second rotating member is connected to the spool that winds up the seat belt.

BRIEF DESCRIPTION OF THE DRAWINGS

FIG. 2(a) is an assembly diagram of the seat belt retractor shown in FIG. 1, and FIG. 2(b) is a sectional view taken along line 2(b)—2(b) in FIG. 2(a);

FIG. 3(a) is a side view of an L gear shown in FIG. 1, and FIG. 3(b) is a sectional view taken along line 3(b)—3(b) in FIG. 3(a);

FIG. 4(a) is a side view of an S gear shown in FIG. 1, and FIG. 4(b) is a sectional view taken along line 4(b)—4(b) in FIG. 4(a);

FIG. 5(a) is a side view of a holding member shown in FIG. 1, and FIG. 5(b) is a sectional view taken along line 5(b)—5(b) in FIG. 5(a);

FIGS. 8(a)–8(c) are drawings showing the operation of the clutch mechanism shown in FIG. 7;

FIG. 10(a) is a side view of an L gear shown in FIG. 9, and FIG. 10(b) is a sectional view taken along line 10(b)—10(b) in FIG. 10(a);

FIG. 11(a) is a side view of a bush shaft shown in FIG. 9, and FIG. 11(b) is a sectional view taken along line 11(b)—11(b) in FIG. 11(a);

FIG. 13(a) is a side view of a bush cover shown in FIG. 9, and FIG. 13(b) is a sectional view taken along line 13(b)—13(b) in FIG. 13(a);

DETAILED DESCRIPTION OF PREFERRED EMBODIMENTS

Figure 1:
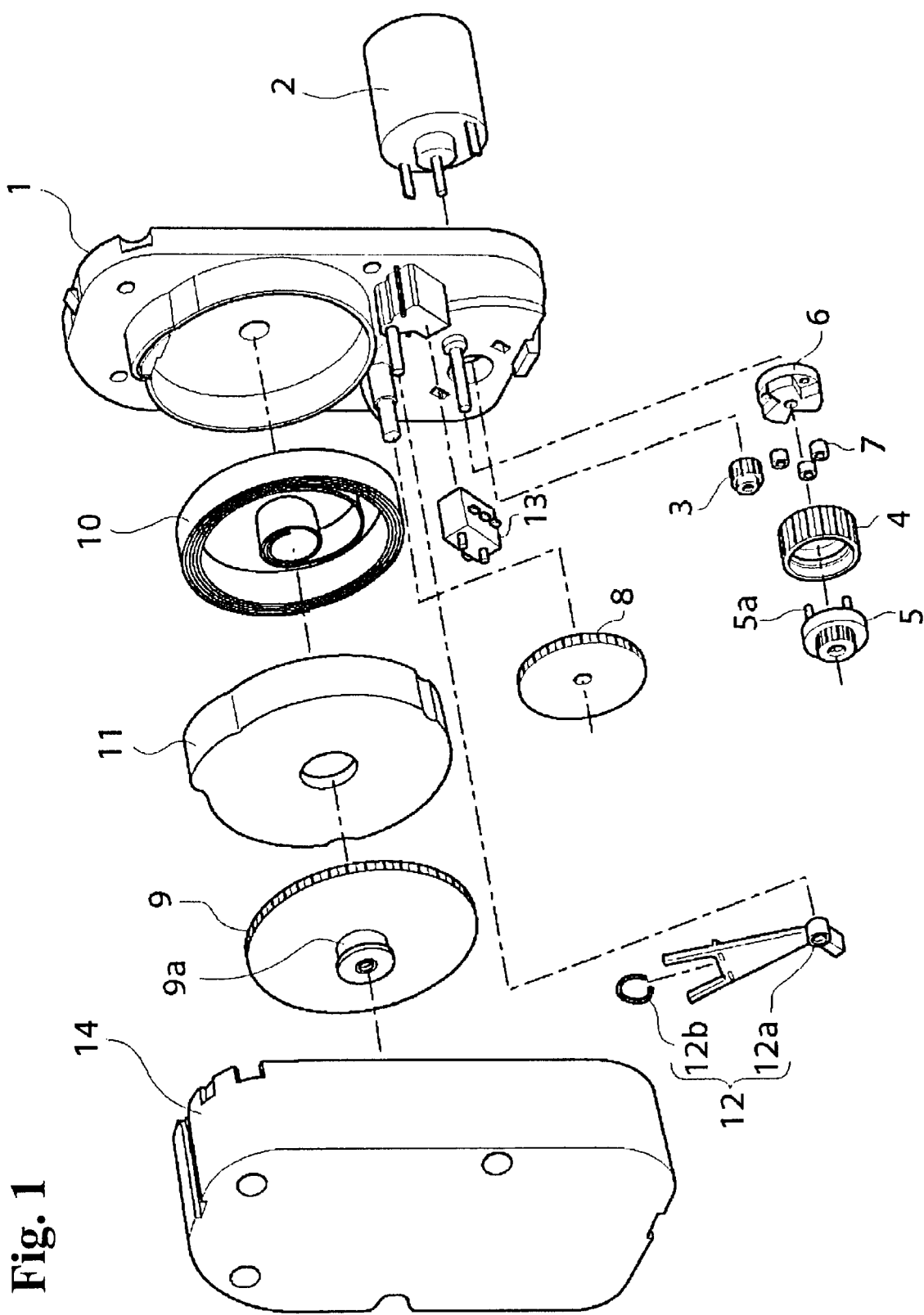
FIG. 1 is an exploded perspective view of an embodiment of a seat belt retractor of the present invention.

Hereinbelow, examples of the present invention are explained with reference to the drawings. FIG. 1 is an exploded perspective view of one embodiment of a seat belt retractor of the present invention, and FIGS. 2(a) and 2(b) are an assembly diagram thereof. In FIG. 1 and FIGS. 2(a) and 2(b), 1 is a retainer, 2 is a motor, 3 is a motor gear, 4 is an L gear or first rotating member, 5 is an S gear or second rotating member, 6 is a holding member, 7 is a roller, 8 is a connect gear, 9 is a bush gear, 9a is a sliding part, 9b is a spline part, 10 is a return spring, 11 is a spring cover, 12 is a rotational direction detection switch, 12a is a switch plate, 12b is a switch spring, 13 is a limit switch, and 14 is a cover. FIG. 2(a) is a front view of the seat belt retractor, wherein the cover 14 is removed, and FIG. 2(b) shows a section view taken along line 2(b)—2(b) in FIG. 2(a).

Driving force of the motor 2 which is attached to the retainer 1 is propagated from the motor gear 3 to the L gear 4. Also, as will be discussed later, it is propagated to the S gear 5 by way of a clutch mechanism constituted by the S gear 5, holding member 6 and roller 7, and is propagated from the S gear 5 to the bush gear 9 by way of the connect gear 8. As is shown in FIGS. 2(a) and 2(b), the return spring 10 is connected to the rotating shaft of the bush gear 9, and it forces the rotation of the bush gear 9 in the direction of retracting the seat belt. In an actual seat belt retractor, a spool that winds up the seat belt is connected to a spline part 9b of the bush gear 9, but in FIG. 1 and FIGS. 2(a) and 2(b), illustration of this part is omitted. The L gear 4, S gear 5, and holding member 6 are held coaxially with a rotating shaft provided on the retainer 1, and the connect gear 8 is held coaxially with another rotating shaft provided on the retainer 1. The bush gear 9 is held on a rotating shaft provided on the cover 14.

The bush gear 9 is provided with the sliding part 9a, and the switch spring 12b of the rotational direction detection switch 12 is attached at its outer perimeter. Also, the switch plate 12a rotates clockwise or counter clockwise according to the rotational direction of the bush gear 9. When the bush gear 9 is rotated in the direction that the seat belt is pulled out, it causes the striker part of the switch plate 12a to operate so as to turn on the contact of the limit switch 13. This limit switch plate 12a also is held on the retainer 1.

The motor 2 is a unidirectional motor, and it is driven in the same direction as the direction of retracting the seat belt, that is, the direction of force of the return spring 10.

FIGS. 3(a) and 3(b) show the L gear 4. In the drawings below as well, the same symbols are assigned to the parts appearing in the previous drawings, and their explanations are omitted. The L gear 4 has a doughnut shape with gear teeth cut out to engage the motor gear 3 on the outer perimeter, and it is made so as to house therein the S gear 5, a part of the holding member 6, and the roller 7. Explaining in further detail, the section of the inner diameter has a T shape as shown in the drawing, the S gear 5 and holding member 6 are inserted into parts of large inner diameter portions on both sides, and a small inner diameter portion in the center is a part that contacts the roller 7.

FIGS. 4(a) and 4(b) show the S gear 5. In FIGS. 4(a) and 4(b), 5b is a gear part, and 5c is an enlarged diameter part. The S gear 5 is constituted mainly by the gear part 5b which engages the connect gear 8, and the enlarged diameter part 5c situated adjacent to that and having an outer diameter slightly smaller than the inner diameter of the L gear 4, and enlarged diameter part 5c is provided with three roller holding parts 5a. The enlarged diameter part 5b is inserted into the part of the large inner diameter portion of the L gear 4. The roller 7 is transfixed by the roller holding part 5a, and this roller 7 is made to be housed between cut-out parts of the holding member 6 to be discussed later. Furthermore, the end of the roller holding part 5a is made to be inserted into an arc-shaped long hole provided on the holding member 6 to be discussed later.

FIGS. 5(a) and 5(b) show a structural drawing of the holding member 6. In FIGS. 5(a) and 5(b), 6a is a cut-out part, 6b is a long hole, and 6c is a protruding part. The outer diameter of the holding member 6 is made slightly smaller than the inner diameter of the part of large inner diameter portion of the L gear 4, and is made to be inserted into the part of the large inner diameter portion of the L gear 4. The holding member 6 is further provided with the fan blade-shaped protruding parts 6c, which have an outer diameter slightly smaller than the inner diameter portion of the L gear 4. Also, by this, there are formed three cut-out parts 6a in the parts where the protruding part 6c is not provided. In each cut-out part 6a, there is formed an arc-shaped long hole 6b, and this long hole 6b is made to be penetrated by a roller holding part 5a of the S gear 5.

The roller 7 held by the roller holding part 5a of the S gear 5 is received between the part of the small inner diameter portion of the L gear 4 and the cut-out part 6a. As shown in FIG. 5(a), the shape of the cut-out part 6a is made such that the space of the cut-out part 6a surrounded by the inner diameter portion of the L gear 4 and the protruding part 6c becomes smaller than the diameter of the roller 7 on one end (the end on the counterclockwise side in the drawing) and this space becomes larger than the diameter of the roller 7 on the other end (the end on the clockwise side in the drawing).

The roller 7 is held on the roller holding part 5a and revolves at the center on the shaft, which is a shaft of the L gear 4 and S gear 5, of the holding member 6 pursuant to rotation of the S gear 5, but at this time, the position of the roller holding part 5a is determined such that the roller 7 revolves while the outer perimeter or periphery of the roller 7 rotates or slides in contact with the part of the small inner diameter portion of the L gear 4.

Figure 6C:
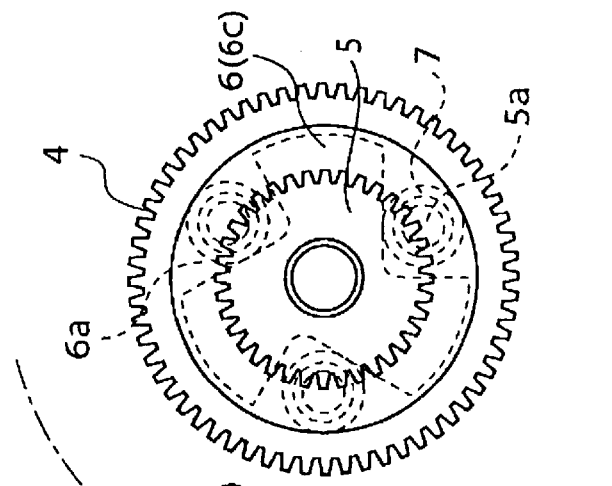
FIGS. 6(a)–6(c) are drawings showing the operation of the clutch mechanism shown in FIG. 1.
Figure 6B:
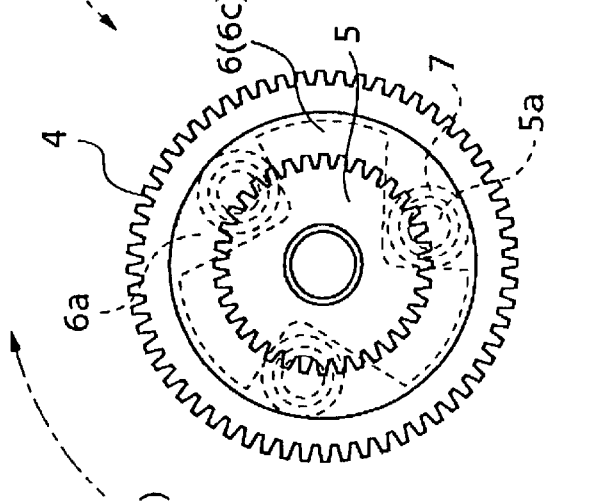
Figure 6A:
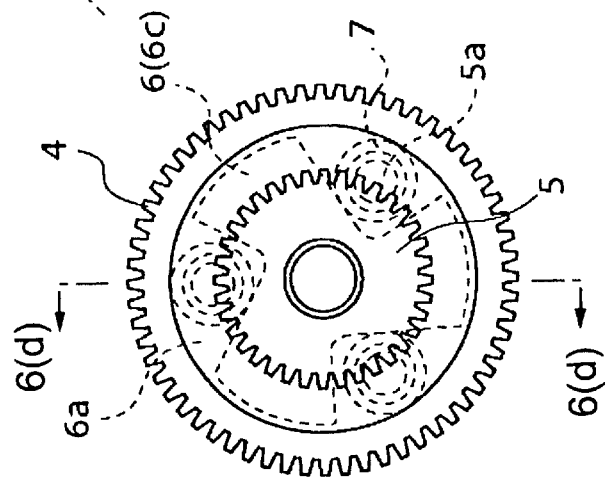
Figure 6D:
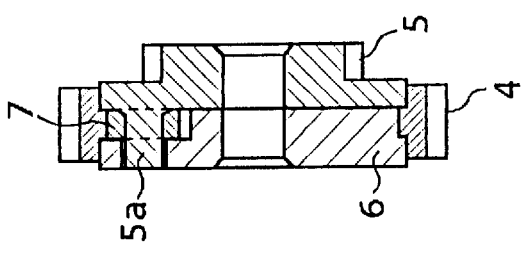
FIG. 6(d) is a sectional view taken along line 6(d)—6(d) in FIG. 6(a)

The S gear 5, holding member 6, and roller 7 of such constitution are housed inside the L gear 4 to constitute a clutch mechanism, and its operation is explained by using FIGS. 6(a)–6(c).

In FIGS. 6(a)–6(d), in order to make the explanation easier to understand, the main components appear as if each component were transparent, except for the sectional view. FIG. 6(a) shows an assembly diagram. The S gear 5 from the right and the holding member 6 from the left are inserted into the parts of the large inner diameter portions of the L gear 4, and the roller 7 held to rotate freely on the roller holding part 5a is in contact with the inner perimeter or periphery of the part of the small inner diameter portion of the L gear 4. The roller holding part 5a is inserted into the long hole 6b provided on the holding member 6.

In the state when the motor 2 is not driven and pulling out force is not applied to the seat belt, the force of the return spring 10 works to retract the seat belt. The retracting force at this time is set to a weak force such that it does not provide a feeling of oppression to the person. When the bush gear 9 rotates by this force, its rotation is propagated to the S gear, and the S gear rotates counterclockwise.

Then, the roller held on the roller holding part 5a moves in revolving at the center on the shaft of the S gear 5 while rotating by the friction with the inner perimeter of the L gear 4, it collides with the protruding part 6c of the holding member 6, and provides counterclockwise rotational force to the holding member 6. Because the holding member 6 is held to rotate freely on its shaft, it rotates substantially with no resistance when rotational force is provided from the roller 7.

Finally, the roller 7 is inserted between the inner perimeter of the L gear 4 and the protruding part 6c of the holding member 6, but because the holding member 6 rotates substantially without resistance together with the S gear 5, the friction between the roller 7 and the inner perimeter of the L gear 4 is not increased. Accordingly, when the S gear 5 is rotated, the roller 7 slides or rotates following the inner perimeter of the L gear 4, and the rotational force of the S gear 5 is not propagated to the L gear 4. In other words, when retracting of the seat belt is performed by only the return spring 10, the motor 2 does not receive a load on that. Therefore, it becomes possible to retract the seat belt with little torque.

FIG. 6(b) is a drawing showing the operation when pulling out of the seat belt is performed by external force. In this case, the S gear 5 is driven counterclockwise according to the arrow. Thus, the roller held on the roller holding part 5a moves in revolving at the center on the shaft of the S gear 5 while rotating by the friction with the inner perimeter of the L gear 4, and it collides with the protruding part 6c of the holding member 6 to provide clockwise rotational force to the holding member 6. Because the holding member 6 is held to rotate freely on its shaft, it rotates substantially without resistance when rotational force is provided from the roller 7.

In this case, which is different from the case explained in the aforementioned case in FIG. 6(a), the roller 7 collides with the protruding part 6c on the side where the space of the cut-out part 6a surrounded by the inner diameter portion of the L gear 4 and the protruding part 6c is made larger than the diameter of the roller 7. Therefore, since the roller 7 is not caught between the inner diameter portion of the L gear 4 and the protruding part 6c, the friction of the roller 7 is not increased.

Accordingly, when the S gear 5 rotates, the roller 7 slides or rotates following the inner perimeter of the L gear 4, and the rotational force of the S gear 5 is not propagated to the L gear 4. In other words, when pulling out of the seat belt is performed by external force, the motor 2 does not receive a load. Therefore, even when a person pulls out the seat belt, because the motor 2 does not receive a load on it, the seat belt can be pulled out with little force. Also, because the above operation is accomplished even during driving of the motor 2, the seat belt can be pulled out easily even during driving of the motor 2.

FIG. 6(c) shows the state when the retraction driving by the motor 2 is performed in a state when pulling out of the seat belt by external force is not performed. In the initial state as explained in FIG. 6(a), the roller 7 is held by the force of the return spring 10 between the inner perimeter of the L gear 4 and the protruding part 6c of the holding member 6 in a state when friction is not increased.

In this state, when the L gear 4 is driven in the counterclockwise direction according to the arrow, a force operates so as to catch the roller 7 between the inner perimeter of the L gear 4 and the protruding part 6c of the holding member 6. Because this force comes to push the protruding part 6c by way of the roller 7, the holding member 6 rotates counterclockwise relative to the S gear 5, and tries to widen the space in which the roller 7 is caught. However, because the roller holding part 5a of the S gear 5 is inserted into the long hole 6b of the holding member 6, the amount of relative rotation between the S gear 5 and the holding member 6 is restricted by the dimensions of the long hole 6b, and it does not exceed a specified value.

Therefore, in the state when this amount of relative rotation has reached the maximum value, the roller 7 is caught between the inner perimeter of the L gear 4 and the protruding member 6c of the holding member 6, and the friction between the roller 7 and the inner perimeter of the L gear 4 becomes greater. Therefore, the roller 7 can no longer slide or rotate, and the rotational force of the L gear 4 is propagated to the S gear 5 by way of the roller 7 and the roller holding member 5a. This rotational force is finally propagated to the bush gear 9, and retraction of the seat belt is performed. Because the seat belt retracting force of the motor 2 is set greater than the seat belt retracting force of the return spring 10, when the motor 2 is driven, retraction of the seat belt can be performed with great retracting force.

Summing up the above explanation, this clutch mechanism has the function of disengaging the mechanical power propagation mechanism between the motor and the seat belt when driven in the direction that the seat belt is pulled out by external force or when the motor is not driven in the direction to retract the seat belt.

Figure 7:
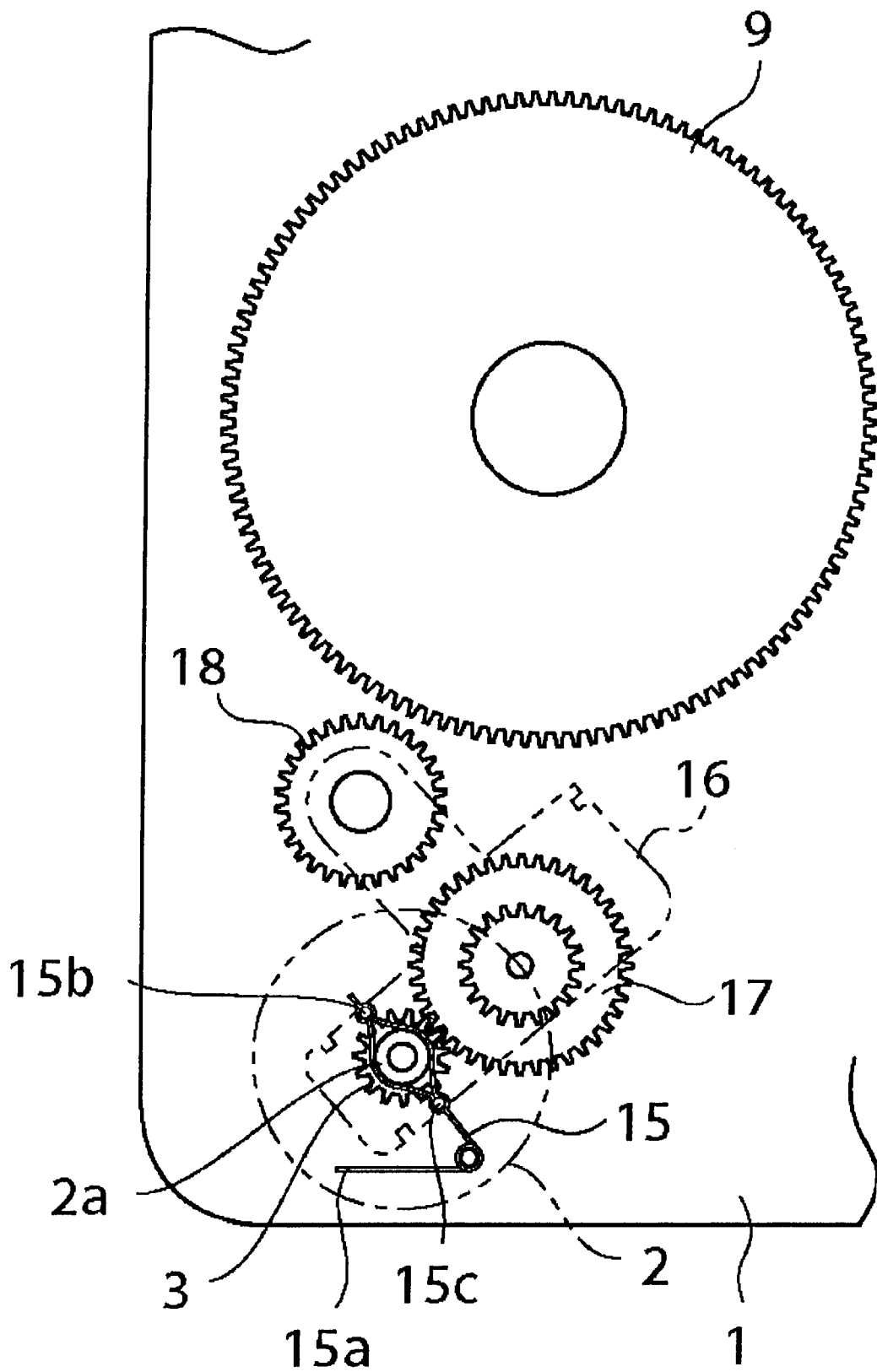
FIG. 7 is a drawing showing another example of a clutch mechanism.

Another example of a clutch mechanism that performs such operation is shown in FIG. 7, and its operation is shown in FIGS. 8(a)–8(c). In these drawings, 2a is a motor shaft, 15 is a hold spring, 15a is one end part, 15b and 15c are fulcra, 16 is a lever, and 17 and 18 are gears held by the lever 16.

As shown in FIG. 7, the motor shaft 2a of the motor 2 has the hold spring 15 attached so as to grasp it from both sides, and one end part 15a of the hold spring is fixed to the retainer 1. The lever 16 has a rotating shaft coaxial with the motor 2, and it is connected to the return spring 15 at the fulcra 15b and 15c. The motor gear 3 is connected to the gear 17, and the gear 17 is connected to the gear 18 by way of two gears not illustrated.

In the state when the motor 2 is not being driven, as shown in FIG. 7, the hold spring 15 forces the lever 16 such that the gear 18 and the bush gear 9 do not engage with each other. Therefore, in the state when the motor 2 is not being driven, the mechanical power propagation circuit between the motor 2 and the seat belt is disengaged, and motor 2 does not become a load on the return spring and the force to pull out the seat belt.

In this state, when the motor 2 is driven and it rotates in the clockwise direction, as shown in FIG. 8(a), the hold spring 15 receives clockwise force as shown by the arrow from the motor shaft 2a. By this, the lever 16 also receives the clockwise force and rotates, and as shown in FIG. 8(b), the gear 18 and the bush gear 9 engage with each other, the motor torque is propagated to the bush gear 9, and retraction of the seat belt comes to be performed by the motor 2. As soon as the gear 18 and the bush gear 9 engage with each other, because that torque works to assist the engagement, and stable propagation of power is accomplished. Therefore, the force provided to hold the spring 15 in order to accomplish the initial engagement is sufficient to be very weak. When rotation of the motor 2 stops, the lever 16 again is forced to rotate in the counterclockwise direction by the force of the hold spring 15, and the engagement of the gear 18 with the bush gear 9 is pulled apart.

FIG. 8(c) shows the state when the seat belt is pulled out by external force during rotation of the motor 2. At this time, the bush gear 9 receives rotational force in the clockwise direction as shown in the drawing, but the gear 18 also is driven in the clockwise direction, and force for pushing the gear 18 counterclockwise is generated between the two. As described before, because the force from the motor shaft 2a which drives the lever 16 in the clockwise direction is very weak, when such state has arisen, the lever 16 rotates counterclockwise, and the engagement of the gear 18 and the bush gear 9 is pulled apart. Therefore, the mechanical power propagation circuit between the motor 2 and the seat belt is disengaged, and the motor 2 is prevented from becoming a load on the force for pulling out the seat belt.

Figure 9:
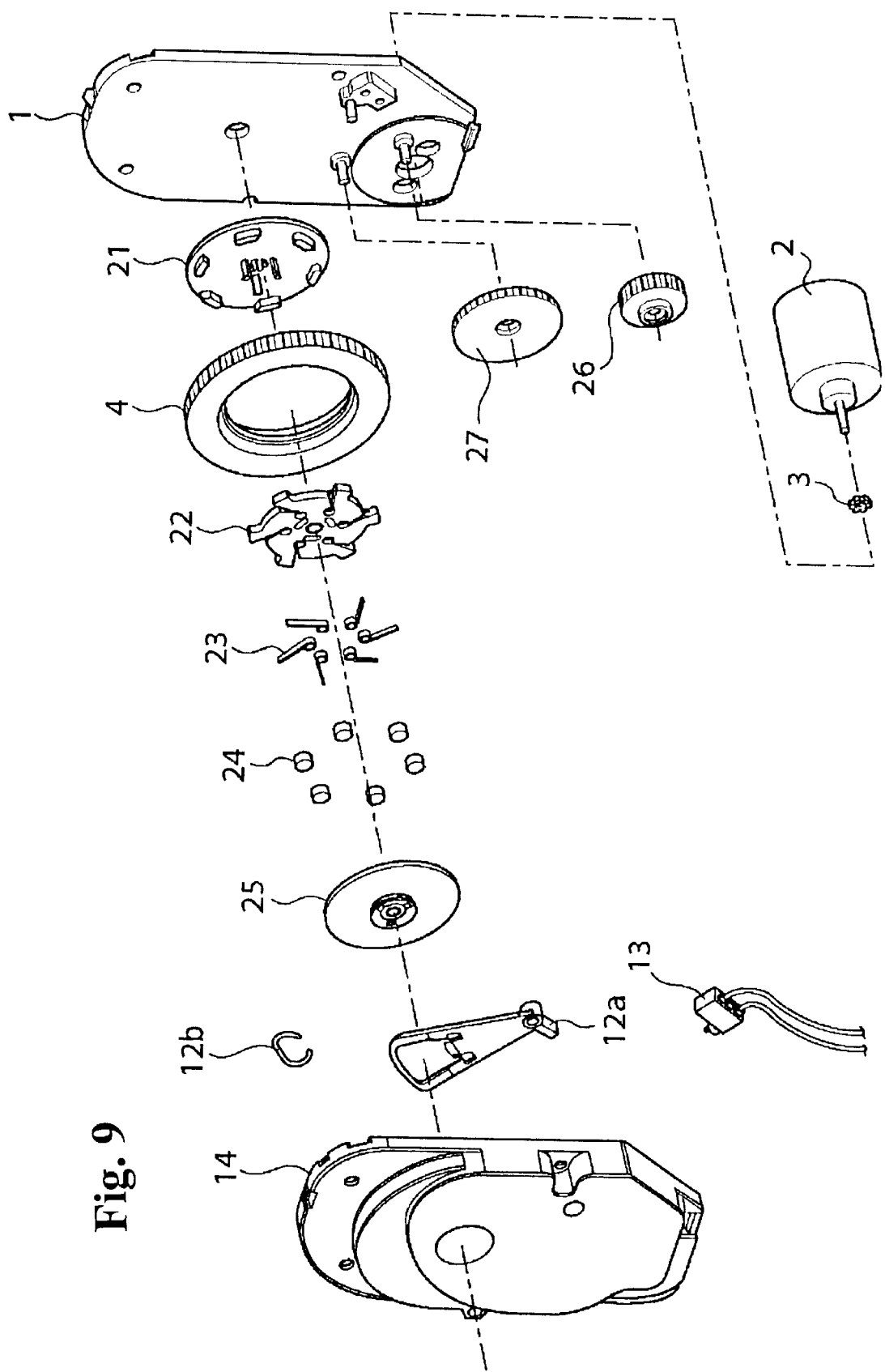
FIG. 9 is an exploded perspective view of a further embodiment of a seat belt retractor of the present invention.

FIG. 9 shows an exploded perspective view of a seat belt retractor, which is another example of the present invention. In FIG. 9, 21 is a bush shaft, 22 is a hold block, 23 is a clutch spring, 24 is a roller, 25 is a bush cover, and 26 and 27 are connect gears.

In this example, it is made such that the return spring is provided on the side of the part (side of the spool) that winds up the seat belt which is provided on the right side (not illustrated) of the retainer 1. The force of the motor 2 attached to the retainer 1 is propagated from the motor gear 3 to the L gear 4 by way of the connect gears 26 and 27. Also, as will be described later, it is propagated to the bush shaft 21 by way of the clutch mechanism constituted by the bush shaft 21, hold block 22, clutch spring 23, roller 24, and bush cover 25. At the center part of the bush shaft 21, there is provided a spline hole, and the spline shaft of the seat belt wind-up part provided on the right side of the retainer 1 is inserted therein so as to rotate. The roles of the switch plate 12a, switch spring 12b, and limit switch 13 are the same as those shown in FIG. 1.

FIGS. 10(a) and 10(b) show the L gear 4. At the large part of the outer perimeter of the L gear 4, gear teeth for engaging the connect gear 27 are cut out, and its inner perimeter part has a T shape as the section shows in the drawing, such that the bush shaft 21 and the bush cover 25 are inserted into the parts of the large inner diameter on both sides, and the hold block 22, roller 24, and clutch spring 23 are inserted into the part of the small inner diameter portion.

FIGS. 11(a) and 11(b) show the bush shaft 21. The bush shaft 21 has a fundamental shape of a silk hat-shaped disk having a wide part in the center where the spline shaft in inserted, and six bumps 21a are provided at equal intervals on one side. Also, near the center, three bosses 21b that pierce through the hold block 22 and couple with a hole of the bush cover 25 are provided at equal intervals. Furthermore, in the part corresponding to the wide part in the center, a spline hole 21c with which the spline shaft couples is opened.

Figure 12A:
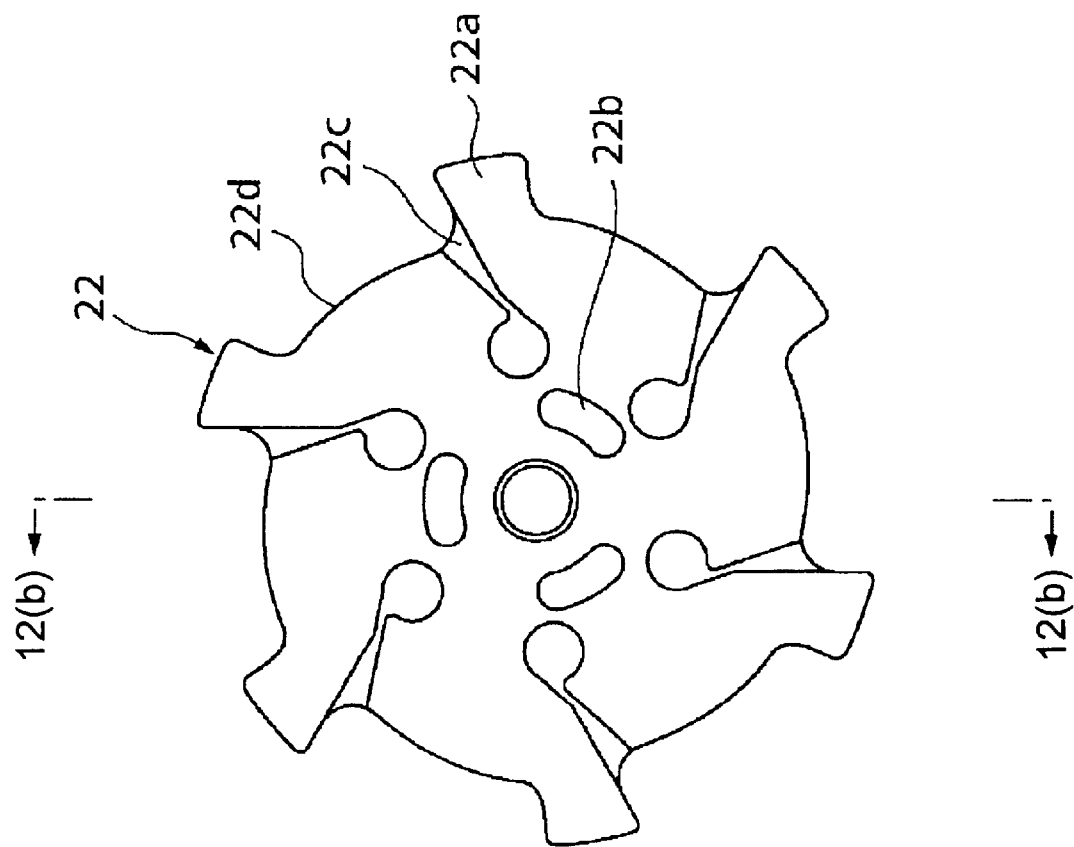
FIG. 12(a) is a side view of a hold block shown in FIG. 9.
Figure 12B:
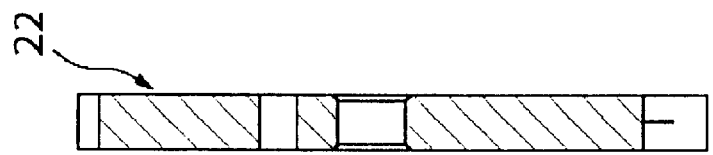
FIG. 12(b) is a sectional view taken along line 12(b)—12(b) in FIG. 12(a)

FIGS. 12(a) and 12(b) show the hold block 22. The hold block 22 has a structure as shown in the drawing, and it has six protruding parts 22a at equal intervals. Also, near the center, long holes 22b that are pierced by the bosses 21b of the bush shaft 21 are opened along the circumference. Also, on the side in the counterclockwise direction of the protruding parts 22a, recessed parts 22c for accommodating the clutch springs 23 are provided along the protruding parts 22a.

The perimeter part 22d of the hold block 22 except for the protruding parts 22a is formed from an arc having a center at a position apart from the center of the hold block 22. Accordingly, the distance between the perimeter part 22d and the center of the hold block 22 is made to be smaller on the clockwise side of the perimeter part 22d and larger on the counterclockwise side.

FIGS. 13(a) and 13(b) show the bush cover 25. The bush cover 25 has a silk hat shape as shown in the drawing, and near the center, three holes through which the bosses 21b of the bush shaft 21 pierce and engage are provided at equal intervals.

Figure 14B:
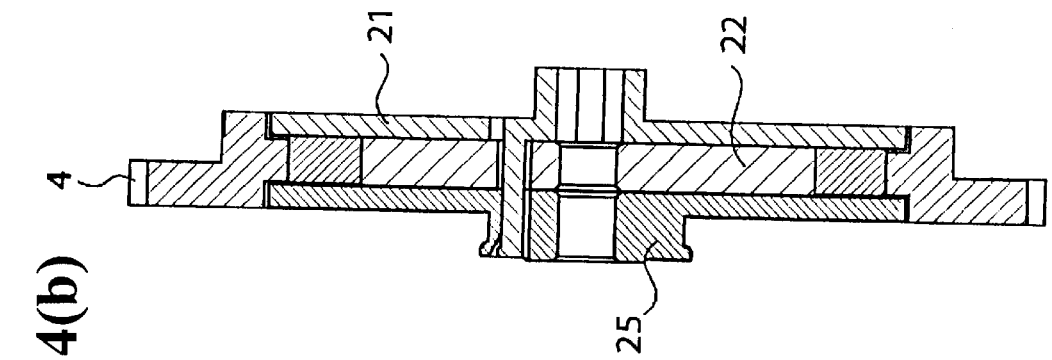
FIG. 14(b) is a sectional view taken along line 14(b)—14(b) in FIG. 14(a)
Figure 14A:
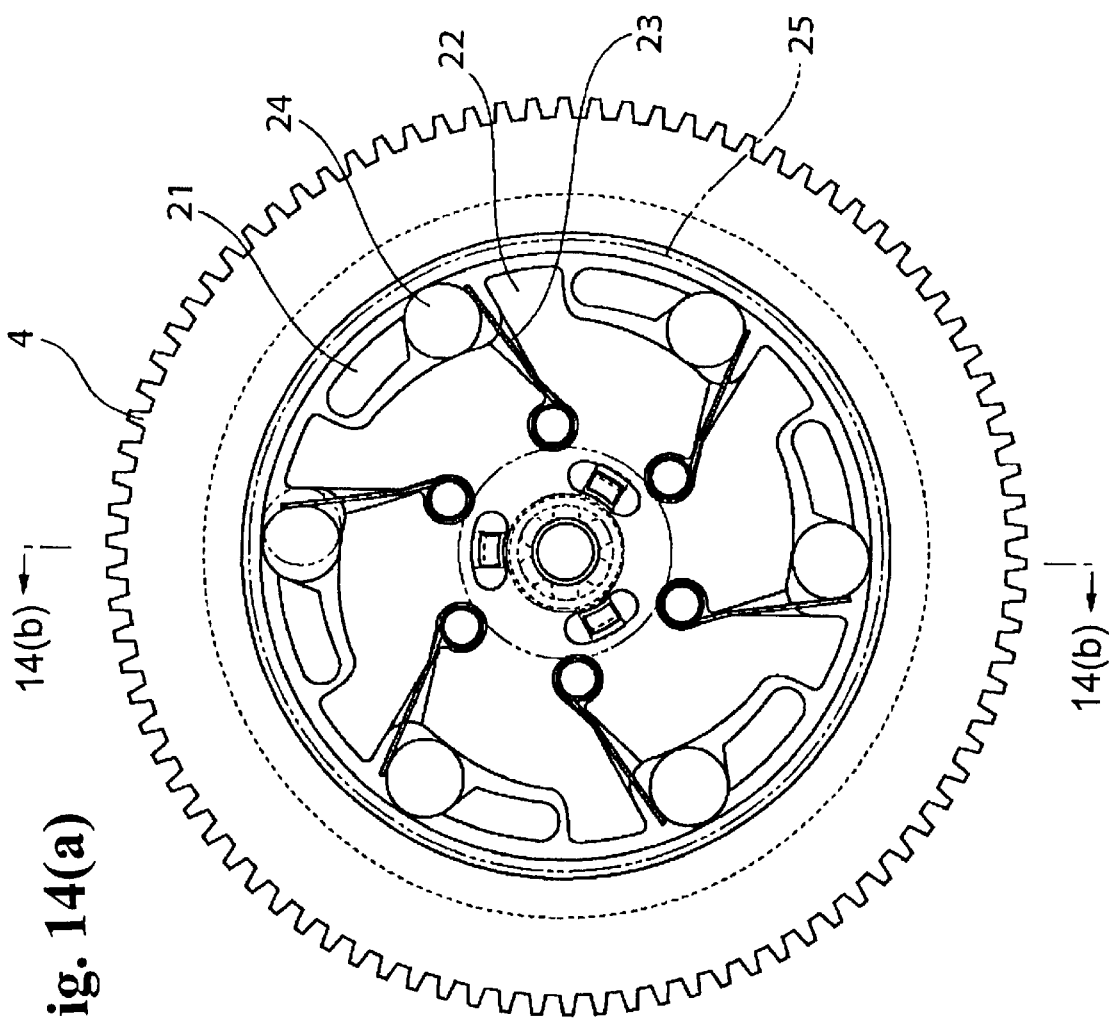
FIG. 14(a) is a side view of an assembly diagram of the clutch mechanism shown in FIG. 9.

FIGS. 14(a) and 14(b) show an assembly diagram of the L gear 4, bush shaft 21, hold block 22, clutch spring 23, roller 24, and bush cover 25. The clutch spring 23 is housed inside the recessed part 22c of the hold block 22 such that its tip is sticking out from the perimeter part 22d of the hold block 22. The roller 24 is disposed so as to be held within the bump 21a of the bush shaft 21 and the protruding part 22a of the hold block 22, and it is forced in the counterclockwise direction by the clutch spring 23.

The hold block 22, clutch spring 23, and roller 24 are held between the bush shaft 21 and the bush cover 25 and are housed inside the L gear 4, and the bosses 21b of the bush shaft 21 are inserted into and engaged with the holes 25a of the bush cover 25, completing the clutch mechanism.

Figure 15A:
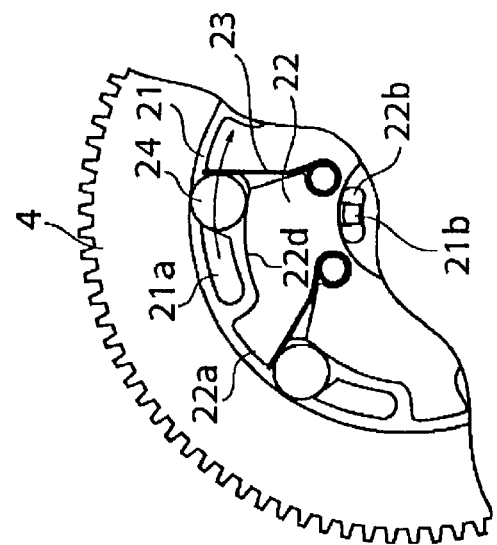
FIGS. 15(a)–15(c) are drawings showing the operation of the clutch mechanism shown in FIGS. 14(a) and 14(b)
Figure 15B:
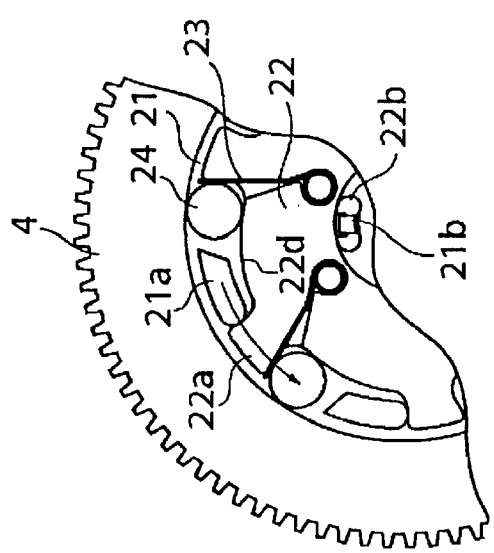
Figure 15C:
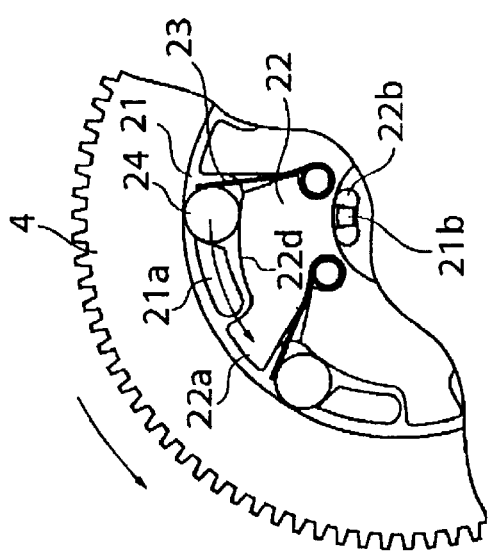

The operation of such clutch mechanism is explained based on FIGS. 15(a)–15(c). FIG. 15(a) shows the state when rotational force in the counterclockwise direction is applied to the L gear 4, and such state is caused when the L gear 4 has received rotational force from the motor 2.

As described previously, the roller 24 is forced toward the left of the drawing by the clutch spring 23. Also, as described previously, because the distance of the perimeter part 22d of the hold block 22 from the center becomes larger toward the left in the drawing, the interval between the perimeter part 22d of the hold block 22 and the inner perimeter of the L gear 4 becomes narrower toward the left in the drawing. Accordingly, the roller 24 is pushed toward the left side of the drawing by the force of the clutch spring 23 up to the position where the interval between the perimeter part 22d of the hold block 22 and the inner perimeter of the L gear 4 becomes equal to the diameter of the roller 24.

Therefore, when the L gear 4 tries to rotate in the counterclockwise direction, the roller 24 is caught between the inner perimeter of the L gear 4 and the perimeter part 22d of the hold block 22, and the rotation of the L gear 4 provides force so as to further push the roller 24 into the part of the narrow gap. Therefore, the roller 24 causes a wedge action between the L gear 4 and the hold block 22, and the rotational force of the L gear 4 is provided to the hold block 22 by way of the roller 24, and therefore the hold block 22 and the roller 24 rotate together with the L gear 4.

Thus, because the roller 24 collides with the bump 21a of the bush shaft 21 and pushes the bump 21a in the counterclockwise direction, the bush shaft 21 also rotates together with the L gear 4. Because the spline hole 21c in the center of the bush shaft 21 is transfixed by the spline shaft of the wind-up part, this rotational force is propagated to the wind-up part.

FIG. 15(b) is a drawing showing the state when counterclockwise rotational force is applied to the bush shaft 21. Such state is caused when the motor 2 is stopped and retraction of the seat belt is performed by only the force of the return spring. When the bush shaft 21 tries to rotate counterclockwise, as shown in the drawing, its bump 21a collides with the protruding part 22a of the hold block, and it causes the hold block 22 to rotate in the counterclockwise direction. Thus, the roller 24 moves relatively toward the right of the hold block 22 in opposition to the force of the clutch spring 23.

As described previously, because the interval between the perimeter part 22d of the hold block 22 and the inner perimeter of the L gear 4 becomes wider toward the right side of the drawing, when the roller 24 moves toward the right side of the hold block 22, a gap appears among the inner perimeter of the L gear 4-roller 24-perimeter part 22d of the hold block 22, and the roller 24 no longer serves the role as a wedge. Therefore, the bush shaft 21 and the hold block 22 rotate in the counterclockwise direction, but its rotational force is not propagated to the L gear 4. That is, the motor 2 which is connected to the L gear 4 does not become a load on this rotational force.

FIG. 15(c) is a drawing showing the state when clockwise rotational force is applied to the bush shaft 21, and such state is generated when the seat belt is pulled out manually. When the bush shaft 21 rotates in the clockwise direction, its bump 21a pushes the roller 24 and causes it to move toward the right side of the drawing.

Because the perimeter part 22d of the hold block 22 and the inner perimeter of the L gear 4 becomes wider on the right side in the drawing, when the roller 24 moves toward the right side of the hold block 22, a gap opens among the inner perimeter of the L gear 4-roller 24-perimeter part 22d of the hold block 22, and the roller 24 no longer serves the role as a wedge. Therefore, the bush shaft 21 and the hold block 22 rotate clockwise, but that rotational force is not propagated to the L gear. That is, motor 2 which is connected to the L gear does not become a load on this rotational force.

In all of the modes above, when the belt is pulled out by external force when the motor is being driven in the direction of retracting the seat belt, the mechanical power propagation circuit between the motor and the seat belt wind-up shaft is disconnected such that the driving force of the motor does not become an obstacle to pulling out of the seat belt. However, during pulling out of the seat belt, it is preferable that the motor be stopped for a time. Particularly in the modes of operation shown in FIG. 7 and FIGS. 8(a)–8(c), when the motor is rotating, because a force so as to cause the gear 18 and the bush gear 9 to engage with each other is working, in the worst case, it is possible that the gears may grind against each other and wear. Also, in the modes of operation such as shown in FIGS. 6(a)–6(c) and FIGS. 15(a)–15(c) as well, because retraction by the motor is restarted as soon as the pulling out is finished, there is a problem in the operability.

In order to eliminate these problems, even if retraction by the motor is being performed, it is preferable that the retraction by the motor be stopped as soon as pulling out of the seat belt is detected. For this, the rotational direction detection switch 12 and the limit switch 13 shown in FIG. 1 are used. As described previously, the rotational direction detection switch 12 operates such that the switch plate 12a rotates clockwise or counterclockwise according to the rotational direction of the bush gear 9, and when the bush gear 9 is rotated in the direction that the seat belt is pulled out, it causes the striker part to operate so as to turn on the contact of the limit switch 13. Therefore, even if the motor 2 is rotating, when the contact of the limit switch 13 is turned on, it should be made such that driving of the motor is stopped.

Also, when the tongue and the buckle of the seat belt are coupled, it is assumed that the person has fastened the seat belt, so that preferably, the retracting is performed by only the return spring. Whether or not the tongue and buckle of the seat belt are coupled can be detected by a well-known buckle switch.

Figure 16:
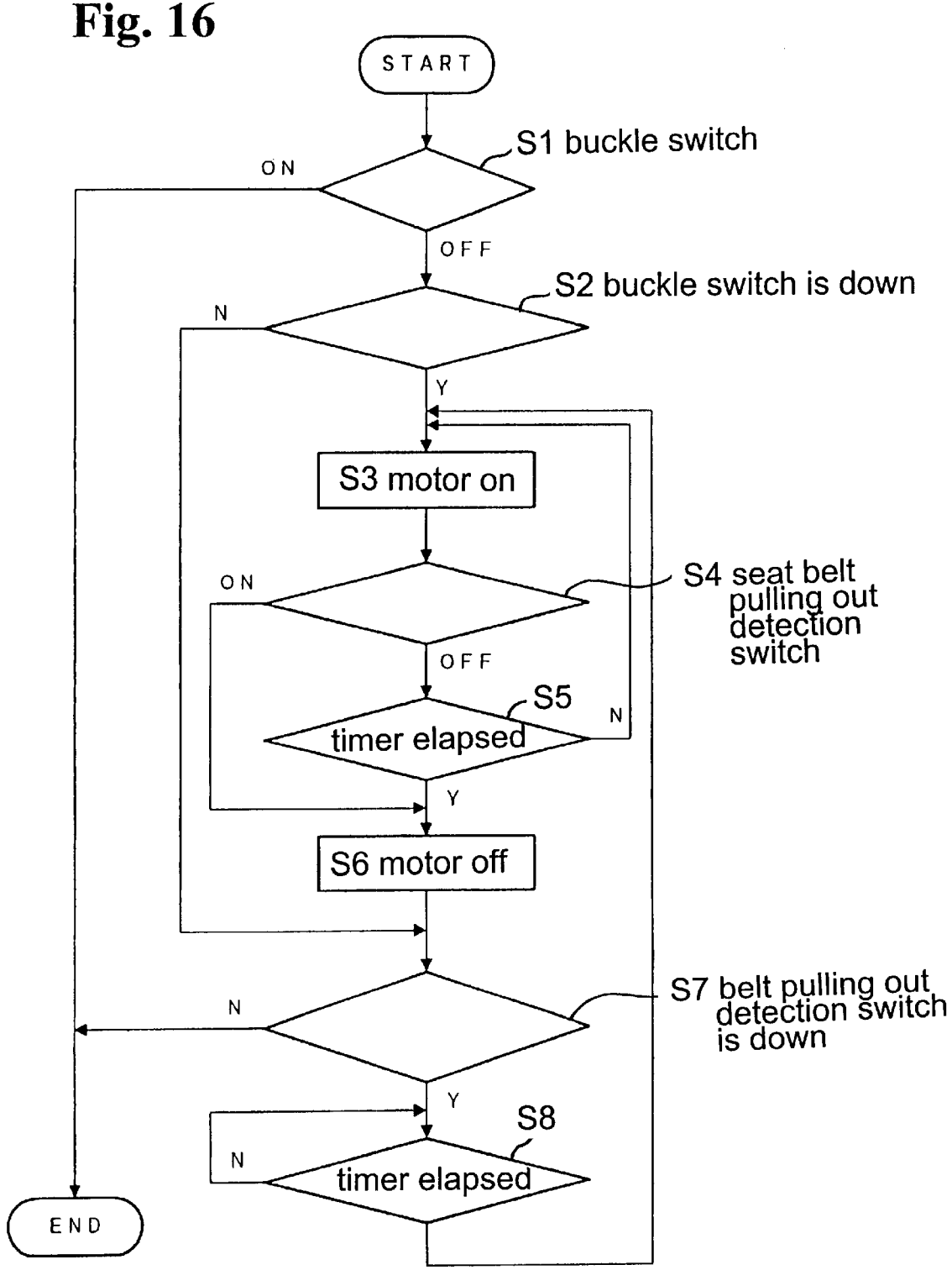
FIG. 16 is a chart showing the flow of control of a motor.

FIG. 16 shows the flow of such motor control. This routine repeats the operation of starting from start and ending at end and then again starting from start after a specified time (for example 100 ms). First, in step S1, it is judged as to whether or not the buckle switch is on, that is, whether or not the tongue and buckle are coupled. When the buckle switch is on, because the tongue and buckle are coupled, it is treated as that the person has fastened the seat belt, and the processing ends without doing anything (without driving the motor).

When the buckle switch is off, in step S2, it is judged as to whether or not the buckle switch is down. This can be judged by whether or not the buckle switch was on at the routine immediately before. When the buckle switch is down, it means that the coupling of the buckle switch was removed, so that the flow moves to step S3, wherein the motor is turned on, and retraction by the motor is started.

When the switch for detecting the pulling out of the seat belt (corresponds to combination of the rotational direction detection switch 12 and the limit switch 13 in FIG. 1) is turned on while the motor is in the on-state, that is, when the seat belt is pulled out, the flow jumps from step S4 to step S6, and the motor is immediately turned off. If the seat belt pulling out detection switch is off, in step S5 it is judged as to whether the timer time has elapsed, and the flow returns to step S3 and continues driving of the motor. When the timer time has elapsed, the flow moves to step S6 and turns off the motor.

After that, in step S7, it is judged as to whether or not the belt pulling out detection switch is down. This is performed by comparing the state of the belt pulling out detection switch immediately before this routine and the present state of the belt pulling out detection switch. When the belt pulling out detection switch is down, in step S8, it waits until the timer time (needs not match the timer time in step S5) has elapsed, and after the timer time has elapsed, the flow moves to step S3 and turns on the motor. When the belt pulling out detection switch is not down, the processing is finished.

In the invention pertaining to the first aspect of the present invention as explained above, the seat belt can be fitted to the person by retracting force that does not provide a feeling of oppression to the person when properly fastened, and it can be retracted by great retracting force during retraction. Also, even when great retracting force is suddenly applied when the coupling of the tongue and the buckle is released, there is no situation such as the tongue striking the window.

In the invention pertaining to the second aspect, in addition to these effects, absorption of the slack of the seat belt and fitting to the person are performed by only the force of a spring member, so that a feeling of oppression is not provided to the person.

In the invention pertaining to the third aspect, in addition to these effects, when the person pulls out the seat belt, there is no need to pull it out against the driving force of the motor, so that it can be pulled out easily.

In the invention pertaining to the fourth aspect, in addition to these effects, substantially all of the slack can be absorbed rapidly, and after that, retraction by the spring member is performed rather than retraction by the motor, so that a feeling of oppression is not provided to the person.

In the invention pertaining to the fifth aspect, in addition to these effects, for example when the seat belt is pulled out manually, control such as detecting that rotation and stopping the rotation of the motor can be performed.

In the invention pertaining to the sixth aspect, in addition to these effects, even when the force of the spring member is little, the slack of the seat belt can be surely absorbed.

In the invention pertaining to the seventh aspect, in addition to these effects, the overall apparatus can be made compact.

In the invention pertaining to the eighth aspect, when the belt is pulled out, the influence of the frictional load of the clutch mechanism can be minimized.

In the invention pertaining to the ninth, tenth and eleventh aspects, power and control devices are not required for various rotating motors, and operation of the clutch can be performed automatically.

In the invention pertaining to the twelfth aspect, the rotational force of the motor can be propagated to the retraction apparatus without using special control and power, and it can be made such that the motor does not become a load on the spring member when the seat belt is pulled out.

While the invention has been explained with reference to the specific embodiments of the invention, the explanation is illustrative and the invention is limited only by the appended claims.

What is claimed is:

1. A seat belt retractor, comprising:
   a reel for winding a seat belt,
   a spring member connected to the reel for providing a retracting force thereto so as not to provide a feeling of oppression to a passenger when the passenger has fastened the seat belt,
   a motor connected to the reel for driving the reel only in a direction of retracting the seat belt and generating a retracting force greater than that of the spring member,
   a clutch mechanism situated between the motor and the reel, said clutch mechanism, when the seat belt is withdrawn from the reel while the motor is being actuated to retract the seat belt, disengaging a connection between the motor and the reel so that the motor does not provide the retracting force to the reel and the seat belt can be freely withdrawn, and
   a detector for detecting a direction of rotation of the reel connected to the reel, said detector having a switch plate moved according a rotation of the reel, and a switch actuated by the switch plate so that when the seat belt is withdrawn, the switch is operated to detect the direction of rotation of the reel, said switch being connected to the motor such that when the switch is turned on while the motor is being actuated to retract the seat belt, the motor is turned off.

2. A seat belt retractor as defined in claim 1, further comprising a connection switch for detecting a connection of a tongue and a buckle attached to the seat belt, said motor providing the retracting force only when the tongue and buckle are not coupled.

3. A seat belt retractor as defined in claim 2, wherein a retraction of the seat belt by the motor is performed for only a specified time after the connection of the tongue and buckle is detected.

4. A seat belt retractor as defined in claim 1, further comprising a power propagation mechanism for propagating the retracting forces of the spring member and the motor to the reel for the seat belt, said power propagation mechanism having a mechanical power propagating circuit and said clutch mechanism, said clutch mechanism disengaging the mechanical power propagation circuit between the motor and the reel for the seat belt when the reel is rotated in a direction to withdraw the seat belt or when the motor does not drive the reel in a direction of retracting the seat belt.

5. A seat belt retractor as defined in claim 4, wherein said power propagation mechanism includes a rotating member for propagating the retracting force of the motor to the reel, said clutch mechanism being incorporated inside the rotating member.

6. A seat belt retractor as defined in claim 4, wherein said clutch mechanism is directly connected to the reel.

7. A seat belt retractor as defined in claim 4, wherein said clutch mechanism comprises:

an outer member having an inner periphery, an inner member situated inside the outer member and including at least one protruding part, and a side surface formed near the at least one protruding part and having a part to form a wedge shape, and at least one roller held between the outer member and the inner member along the side surface such that an interval between the side surface and the inner periphery of the outer member is partly wider than a diameter of the roller and is partly narrower than the diameter of the roller due to the wedge shape to thereby form narrow and wide interval portions, said at least one roller biting the side surface of the inner member and the inner periphery of the outer member at the narrower interval portion to form an engaged state for the clutch, the clutch being in a disengaged state when the roller is located in the wide interval portion.

8. A seat belt retractor as defined in claim 7, wherein said outer member is formed of a first rotating member, and said inner member is formed of a second rotating member and a holding member, which are situated inside the first rotating member coaxially therewith, said second rotating member having at least one roller holding part extending in an axial direction to hold the roller so that the roller freely rotates in contact with the inner periphery of the first rotating member; said holding member has a cut-out part for accommodating the roller therein, said cut-out part having the wedge shape to form the narrow and wide interval portions at two ends of a space surrounded by the cut-out part; and a mechanism for allowing only a specified amount of a relative rotation between the second rotating member and the holding member is provided on the second rotating member and the holding member.

9. A seat belt retractor as defined in claim 8, wherein said holding member includes an elongated hole for receiving the roller holding part therein, said elongated hole and the roller holding part forming the mechanism for allowing the relative rotation.

10. A seat belt retractor as defined in claim 9, wherein said second rotating member and the holding member are situated adjacent to each other inside the first rotating member, and a plurality of the rollers is situated around the holding member at a predetermined interval therebetween.

11. A seat belt retractor as defined in claim 7, wherein said outer member is formed of a first rotating member, and said inner member is formed of a second rotating member and a holding member, which are situated inside the first rotating member coaxially therewith; said second rotating member has a bump on one side; said holding member has the side surface where a distance from a center changes continuously to thereby form the narrow and wide portions at the side surface thereof, and a spring member, said at least one protruding part being formed to extend outwardly from a part of the side surface; when the second rotating member, the holding member and the roller are incorporated in the first rotating member, the roller is positioned in a space surrounded by the inner periphery of the first rotating member, the side surface of the holding member, the protruding part of the holding member, and the bump of the second rotating member; said narrow and wide interval portions are formed between the inner periphery of the first rotating member and the side surface of the holding member; and said spring member is disposed to urge the roller toward the narrow interval portion between the inner periphery of the first rotating member and the side portion of the holding member.

\* \* \* \* \*